US012811782B2

(12) United States Patent
Martinez

(10) Patent No.: US 12,811,782 B2
(45) Date of Patent: Nov. 24, 2026

(54) SYSTEM AND METHOD FOR SECURE OPTICAL ENCRYPTION AND AUTHENTICATION USING EYE-TRACKING AND NEUROMORPHIC COMPUTING

(71) Applicant: Joshua Martinez, Las Vegas, NV (US)

(72) Inventor: Joshua Martinez, Las Vegas, NV (US)

( * ) Notice: Subject to any disclaimer, the term of this patent is extended or adjusted under 35 U.S.C. 154(b) by 0 days.

(21) Appl. No.: 19/243,050

(22) Filed: Jun. 19, 2025

(65) Prior Publication Data

US 2025/0392457 A1 Dec. 25, 2025

Related U.S. Application Data

(60) Provisional application No. 63/661,681, filed on Jun. 19, 2024.

(51) Int. Cl.
*H04L 9/08* (2006.01)
*G06F 3/01* (2006.01)
*G06F 21/32* (2013.01)
*H04L 9/00* (2022.01)

(52) U.S. Cl.
CPC ............ *H04L 9/0866* (2013.01); *G06F 3/013* (2013.01); *G06F 21/32* (2013.01); *H04L 9/50* (2022.05)

(58) Field of Classification Search
CPC ......... H04L 9/0866; H04L 9/50; G06F 3/013; G06F 21/32
See application file for complete search history.

(56) References Cited

U.S. PATENT DOCUMENTS 7,986,816 B1 7/2011 Hoanca et al.
11,294,459 B1 4/2022 Richman et al.
2012/0086645 A1 4/2012 Zheng et al.
2015/0143538 A1 5/2015 Tsou
2016/0307035 A1 10/2016 Schilling et al.
(Continued)

FOREIGN PATENT DOCUMENTS

EP 4105921 A1 12/2022

OTHER PUBLICATIONS

Maymon, Christopher, et al. "Virtual Reality in Behavioral Neuroscience: New Insights and Methods". Cham : Springer; 2023, Current Topics in Behavioral Neurosciences, 65, 1st ed. 2023 Edition.

(Continued)

*Primary Examiner* — Normin Abedin
(74) *Attorney, Agent, or Firm* — Jacob M. Ward; Ward Law Office LLC

(57) ABSTRACT

A system for secure optical encryption and authentication for a user within an extended reality space is provided. The system includes an eye-tracking device, a processor, and a memory in communication with the processor that includes a user interface module to allow the user to select the message option, a gaze-tracking module to receive the message option from the user interface module and the eye movement data from the eye-tracking device, and generate an adaptive gaze tensor, a neuromorphic computing module to receive the eye movement data and the adaptive gaze tensor from the gaze-tracking module, and update the adaptive gaze tensor when a change in behavior is found in the eye movement data, an artificial intelligence (AI) module to assist the gaze-tracking module and the neuromorphic computing module, and an authentication module to receive the adaptive gaze tensor and generate an encryption key based on the adaptive gaze tensor.

20 Claims, 16 Drawing Sheets

(56) References Cited

U.S. PATENT DOCUMENTS

| | | | |
|---|---|---|---|
| 2017/0026368 | A1 | 1/2017 | Lo et al. |
| 2017/0083695 | A1 | 3/2017 | San Agustin et al. |
| 2018/0091972 | A1 | 3/2018 | Yeager et al. |
| 2019/0073460 | A1 | 3/2019 | Lubetkin |
| 2020/0249080 | A1 | 8/2020 | Petty et al. |
| 2021/0335076 | A1 | 10/2021 | Westmacott et al. |

OTHER PUBLICATIONS

Johannesson, Martina, "4 ways to use Muse Chat in your workflow." Unity Technologies, Unity Blog, Aug. 31, 2023, https://unity.com/blog/engine-platform/use-muse-chat-in-your-workflow.
Tobii Corporate: About Tobii—Our business & organization, Website, https://corporate.tobii.com/.

SYSTEM AND METHOD FOR SECURE OPTICAL ENCRYPTION AND AUTHENTICATION USING EYE-TRACKING AND NEUROMORPHIC COMPUTING

CROSS-REFERENCE TO RELATED APPLICATIONS

This application claims the benefit of U.S. Provisional Application No. 63/661,681, filed on Jun. 19, 2024. The entire disclosure of the above application is incorporated herein by reference.

FIELD

The present technology relates ways of providing secure optical encryption and authentication within extended reality spaces, and, more particularly, to the integration of eye-tracking technology and neuromorphic computing for managing encrypted communications.

Introduction

This section provides background information related to the present disclosure which is not necessarily prior art.

In the realm of digital communication, there is a need for secure and efficient messaging systems. As technology advances, the integration of extended reality (XR) spaces into daily life may introduce new challenges in maintaining data security and user privacy. Certain methods of encryption may rely on tactile inputs, such as keyboards or touchscreens, which may be susceptible to interception and unauthorized access. These encryption methods may not fully utilize the potential of XR spaces, where immersive and non-tactile interactions may be increasingly prevalent.

Eye-tracking technology may emerge as a useful tool for enhancing user interaction within XR spaces. By capturing and analyzing eye movements, it may be possible to create more intuitive and immersive user interfaces. Application of eye-tracking data for secure communication and encryption may accordingly be incorporated into XR spaces. Effectively utilizing eye-tracking data to generate dynamic encryption keys may allow for balancing both security and adaptability with regard to user behavior.

Neuromorphic computing, which mimics the neural architectures of the human brain, may offer a solution for processing complex data inputs such as eye movements. This technology may enable the development of systems that can efficiently analyze and respond to user interactions in real-time. Despite its potential, the integration of neuromorphic computing with eye-tracking technology for encryption purposes may not be fully realized. The complexity of processing eye-tracking data and generating secure encryption keys may therefore present barriers to maintaining consistent security levels while processing large volumes of data in real-time environments.

The use of blockchain technology for secure data storage and transmission provides a way to secure digital communication, where the decentralized and tamper-proof nature of blockchain technology provides certain benefits. Certain issues remain, however, in effectively integrating blockchain with other technologies, such as eye-tracking and neuromorphic computing, to create a cohesive and secure communication system. The interoperability of eye-tracking data and neuromorphic computing in blockchain transactions may present challenges in coordinating data processing speeds, maintaining data integrity across distributed networks, and ensuring secure transmission of biometric information between system components.

Biometric data, such as eye movements, may offer an opportunity for creating personalized and secure encryption keys. However, the variability in biometric data due to environmental and cognitive factors may pose a difficulty in maintaining consistent security levels. The development of adaptive systems that may account for environmental and cognitive variations may be employed to ensure reliable encryption; however, certain systems may not fully address the dynamic nature of biometric data, leading to potential vulnerabilities.

There is a continuing need for a secure and adaptive encryption system that utilizes the capabilities of eye-tracking technology, neuromorphic computing, and blockchain. Desirably, such a system would provide a non-tactile input method for generating dynamic encryption keys while enhancing user interaction and data security within XR spaces. The integration of these technologies may address the limitations of other encryption methods, offering a more secure and user-friendly solution for digital communication and real-time authentication that adapts to various environmental conditions and user behaviors, addressing the limitations of current biometric technologies while enhancing user privacy and system reliability.

SUMMARY

In concordance with the instant disclosure of the present invention, a secure and adaptive encryption system that utilizes the capabilities of eye-tracking technology, neuromorphic computing, and blockchain, has surprisingly been discovered.

The present technology includes systems and processes that relate to the integration of eye-tracking and neuromorphic computing for dynamic and adaptive security and authentication solutions. By integrating eye-tracking technology and neuromorphic computing, the system may generate dynamic encryption keys based on adaptive gaze tensors, enhancing data security and user interaction. The system may provide a non-tactile input method, reducing vulnerabilities associated with tactile inputs like keyboards. The use of blockchain technology may further ensure secure data storage and transmission, utilizing the decentralized and tamper-proof nature of a blockchain network. The adaptability of the system to user behavior and environmental changes may address the variability in biometric data, thereby maintaining a consistent level of security. The present technology offers a robust, user-friendly solution for digital communication, enhancing privacy and security in environments, including immersive extended reality (XR) spaces.

In certain embodiments, a system for secure optical encryption and authentication for a user within an environment is provided. The system may include an eye-tracking device to capture an eye movement of a user and generate an eye movement data. The system may include a processor and a memory in communication with the processor. The memory may include a user interface module to display a message option to the user and allow the user to select the message option. The memory may include a database to store the message option, the adaptive gaze tensor, and the encryption key. The memory may include a gaze-tracking module to generate an adaptive gaze tensor based on the message option and the eye movement data. The memory may include a neuromorphic computing module to update the adaptive gaze tensor when a change in behavior is found in the eye movement data. The memory may include an authentication module to generate an encryption key based on the adaptive gaze tensor and encrypt the message option based on the encryption key, creating an encrypted message. The memory may include a communication module to receive and transmit the encryption key and the encrypted message to a blockchain network.

In certain embodiments, a method for secure optical encryption and authentication for a user within a digital space is provided. The method may operate in conjunction with a system for secure optical encryption and authentication for a user, as described herein. The method may include a step of capturing the eye movement of the user and generating the eye movement data via the eye-tracking device. The method may include a step of displaying the message option to the user and allowing the user to select the message option via the user interface module. The method may include a step of storing the message option, the adaptive gaze tensor, and the encryption key in the database. The method may include a step of receiving the message option from the user interface module and the eye movement data from the eye-tracking device and generating an adaptive gaze tensor based on the message option and the eye movement data via gaze-tracking module. The method may include a step of receiving the eye movement data and the adaptive gaze tensor from the gaze-tracking module and updating the adaptive gaze tensor when a change in behavior is found in the eye movement data via the neuromorphic computing module. The method may include a step of receiving the adaptive gaze tensor from the neuromorphic computing module and generating an encryption key based on adaptive gaze tensor via the authentication module.

In certain embodiments, a non-transitory computer-readable medium storing processor instructions for secure optical encryption and authentication for a user is provided. When executed by a processor, the processor instructions may cause the processor to display a message option to the user. The processor instructions may cause the processor to allow the user to select the message option. The processor instructions may cause the processor to capture an eye movement of the user. The processor instructions may cause the processor to generate an eye movement data. The processor instructions may cause the processor to generate an adaptive gaze tensor based on the message option and the eye movement data. The processor instructions may cause the processor to update the adaptive gaze tensor when a change in behavior is found in the eye movement data. The processor instructions may cause the processor to generate an encryption key based on adaptive gaze tensor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 4A:
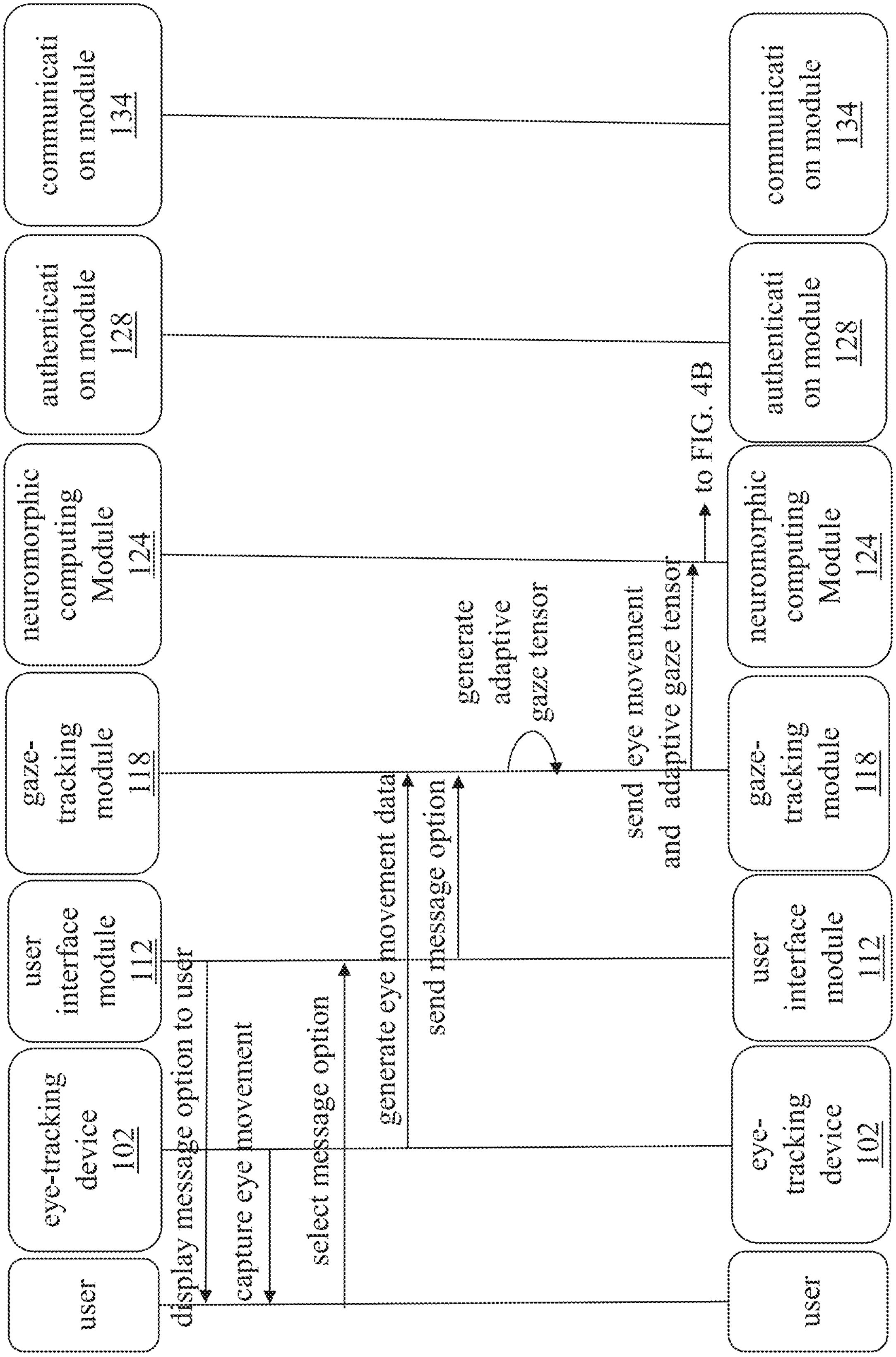
Figure 4B:
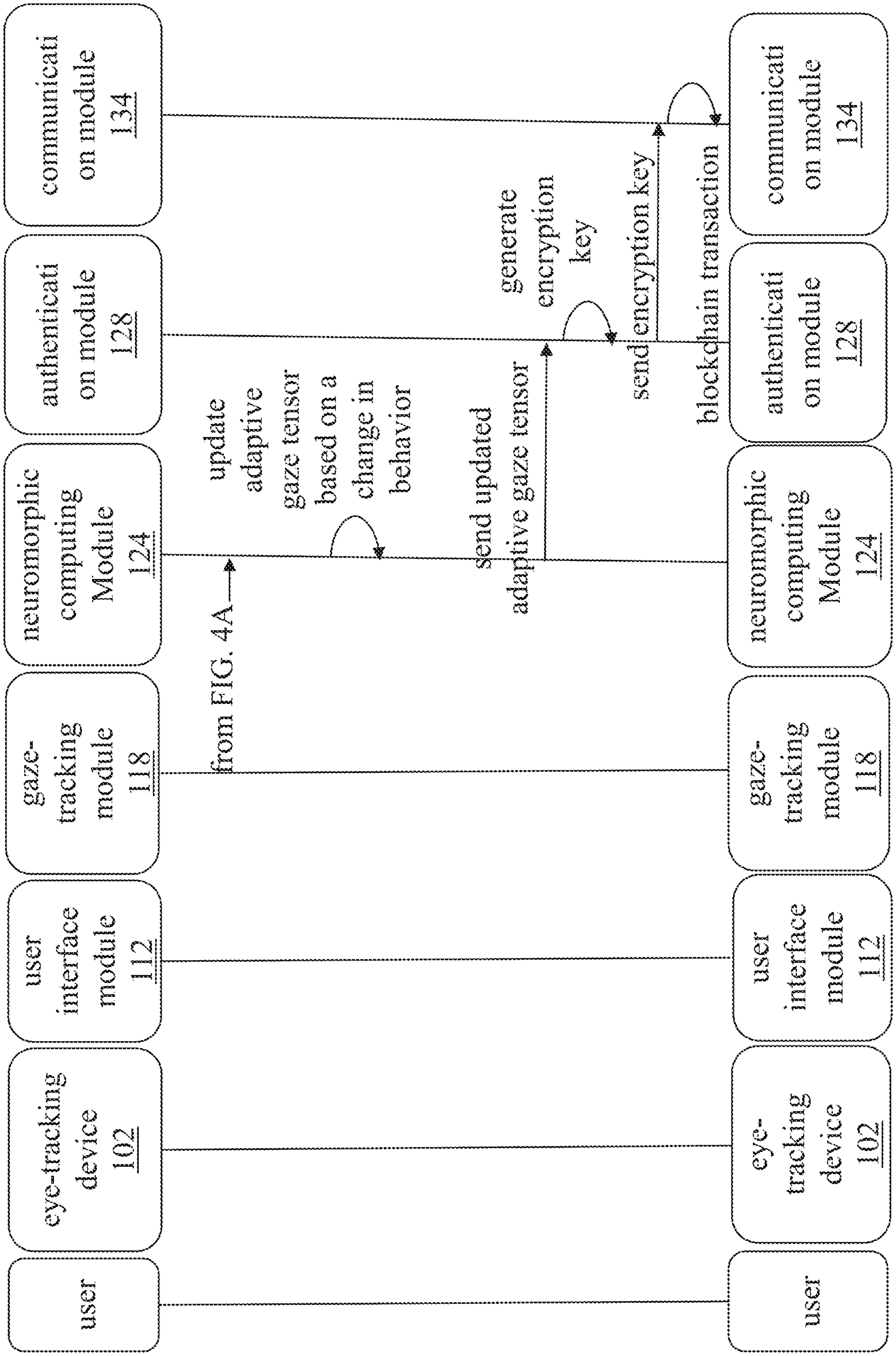
Figure 5:
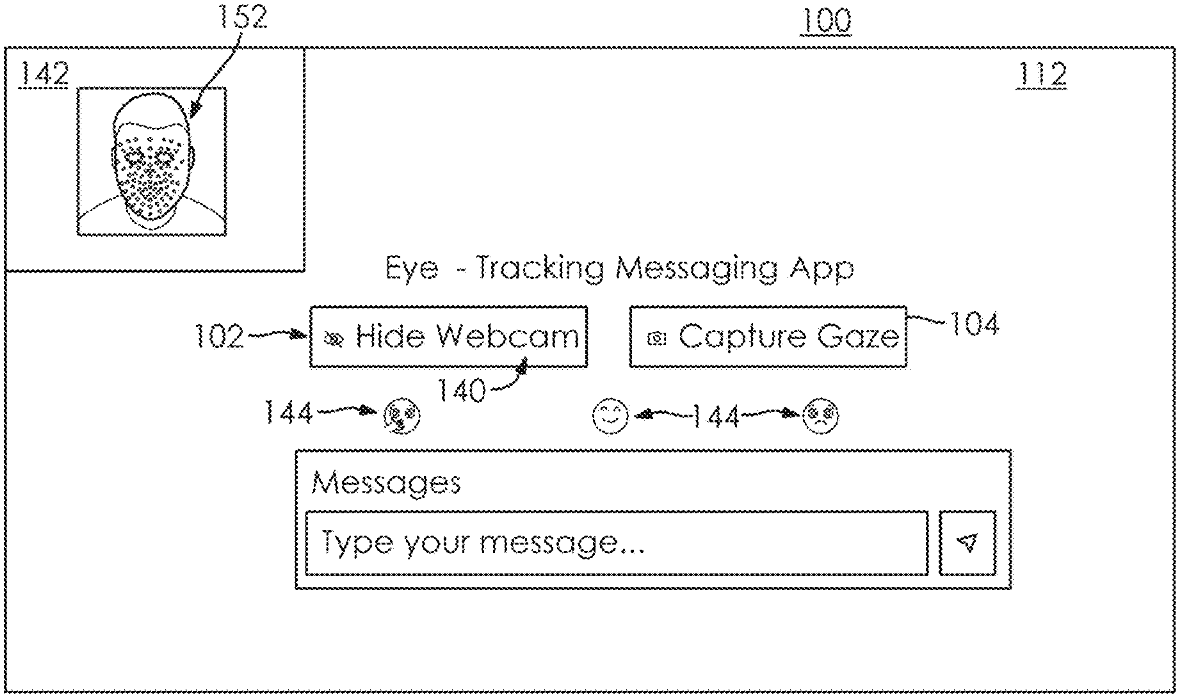
Figure 6:
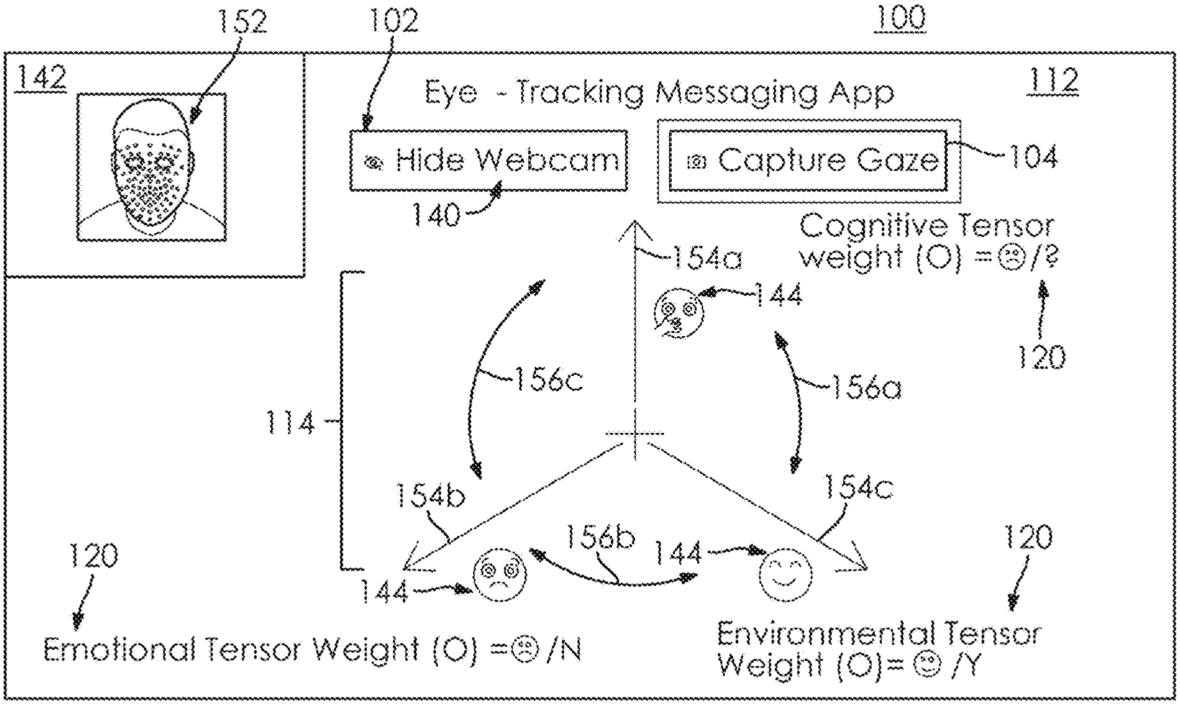
Figure 7:
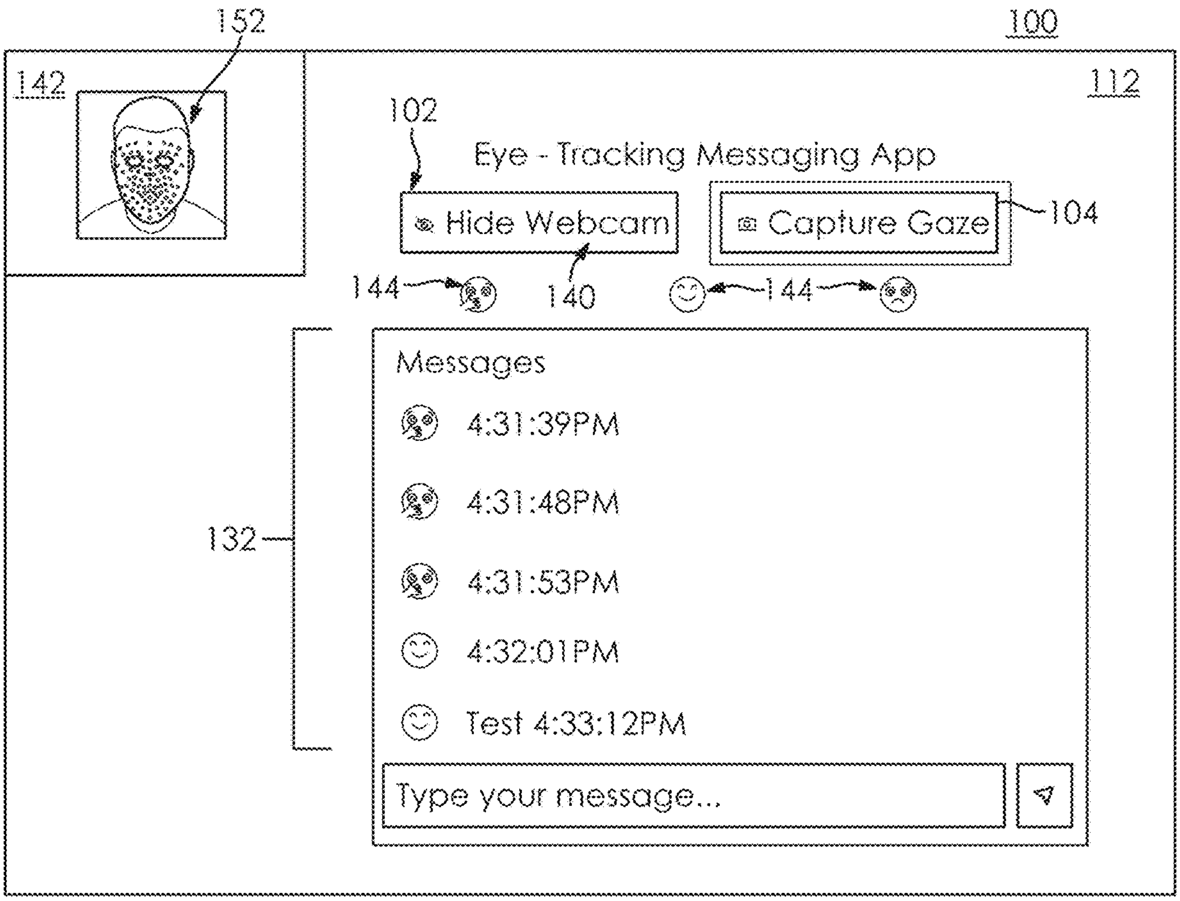
Figure 8:
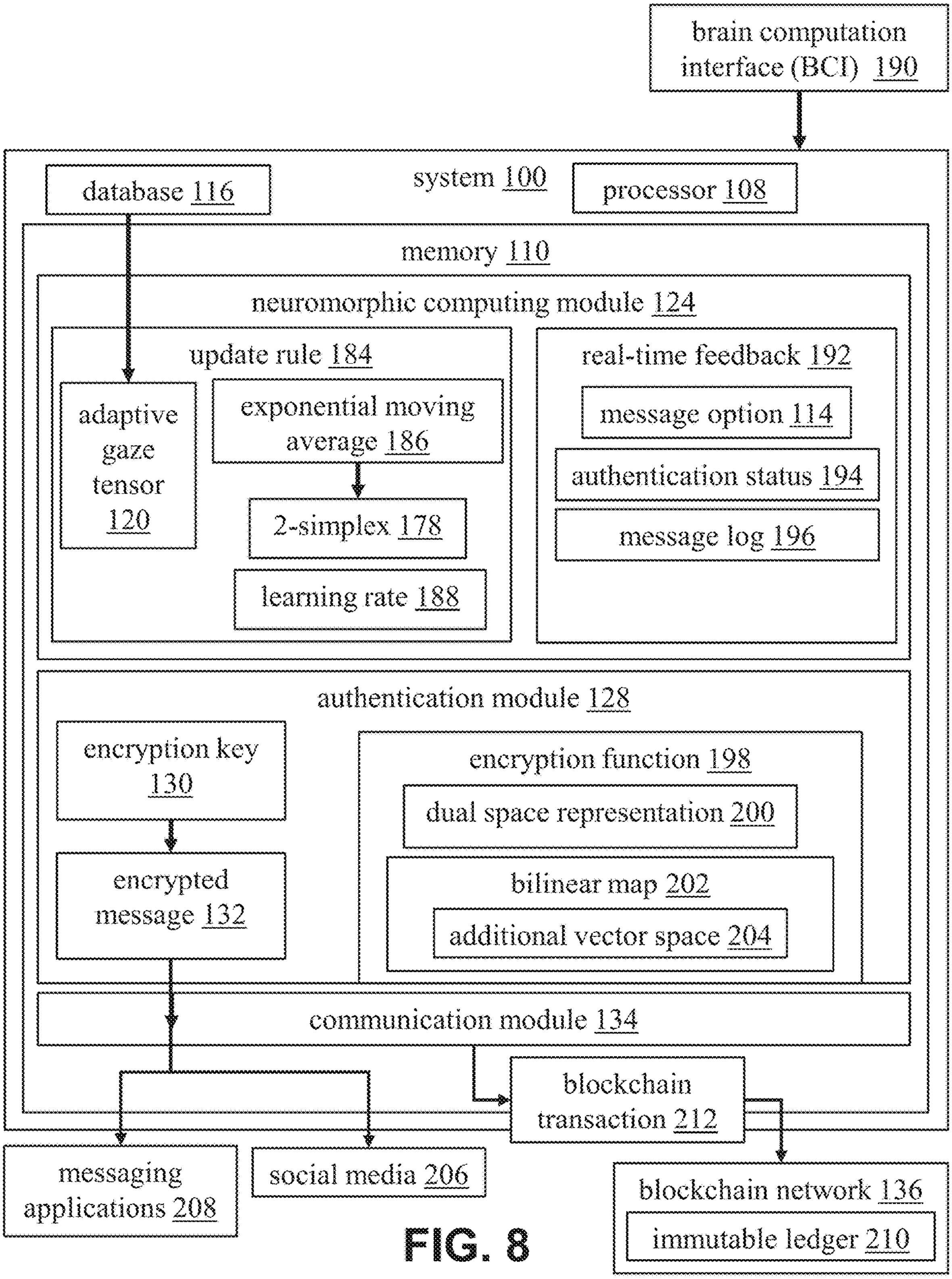
Figure 9A:
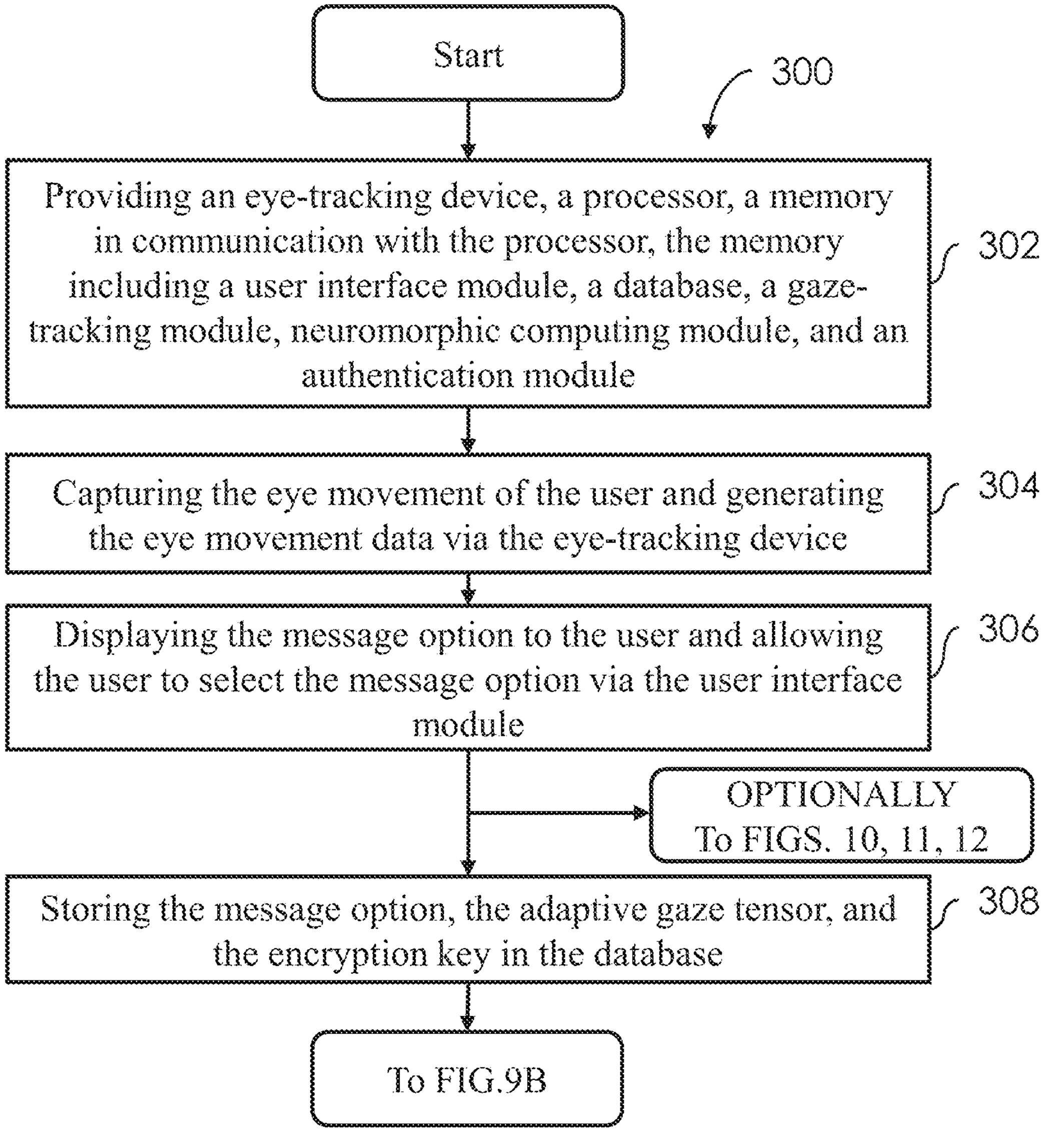
Figure 9B:
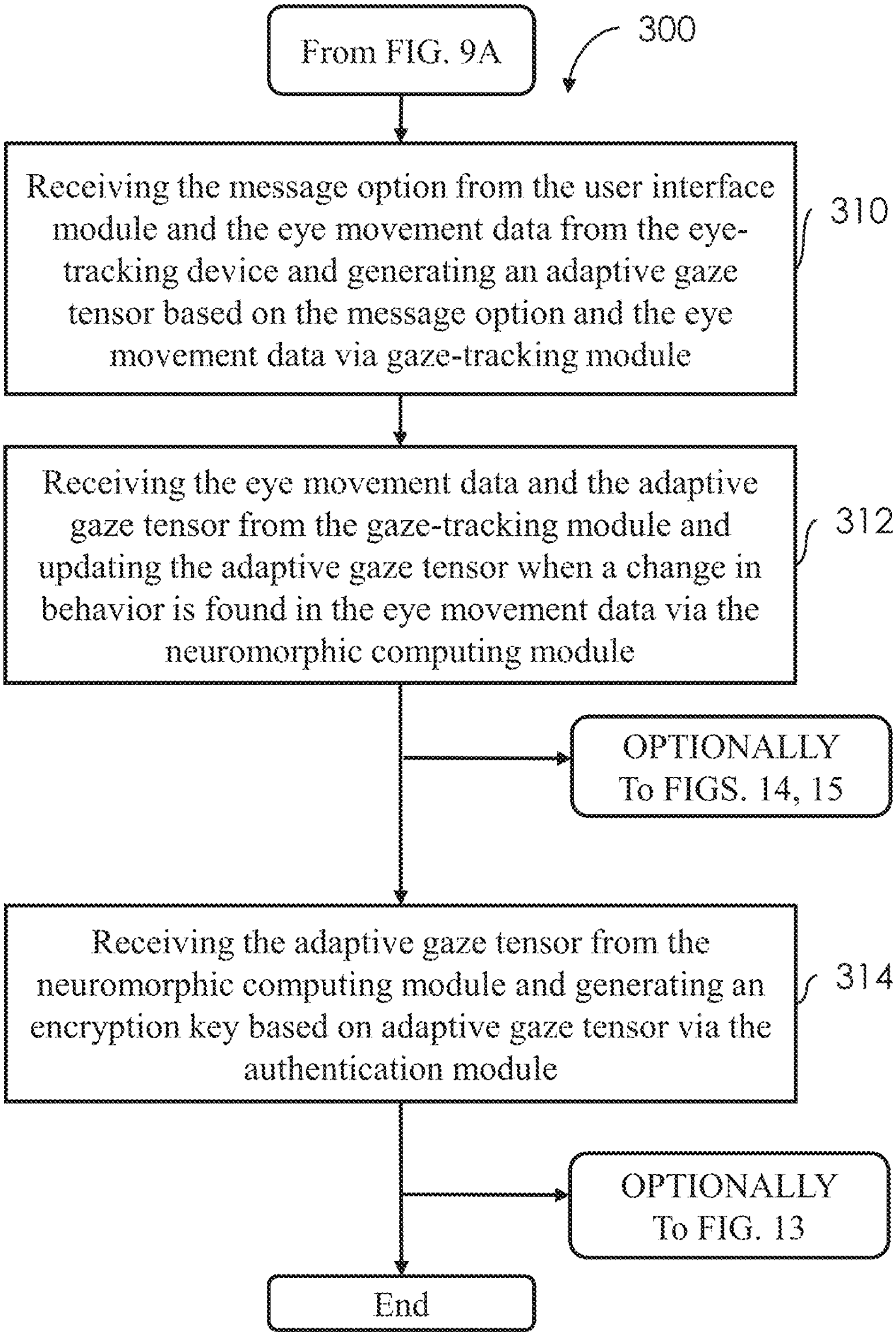
Figure 10:
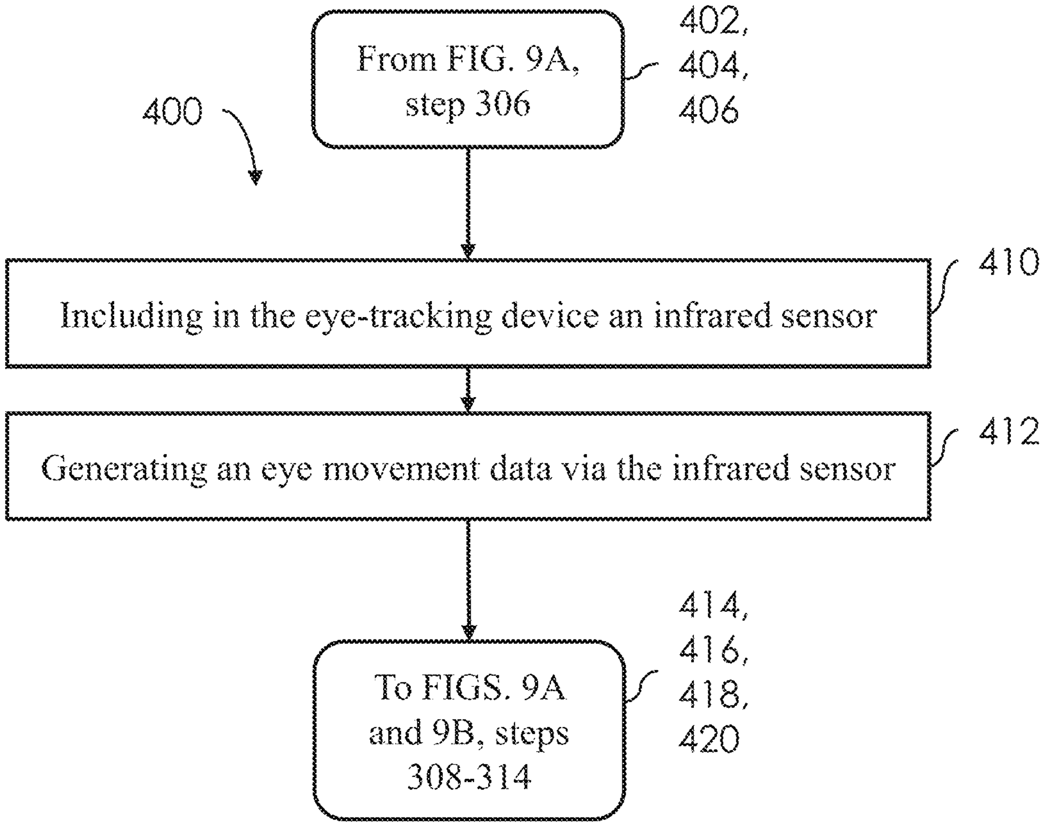
Figure 11:
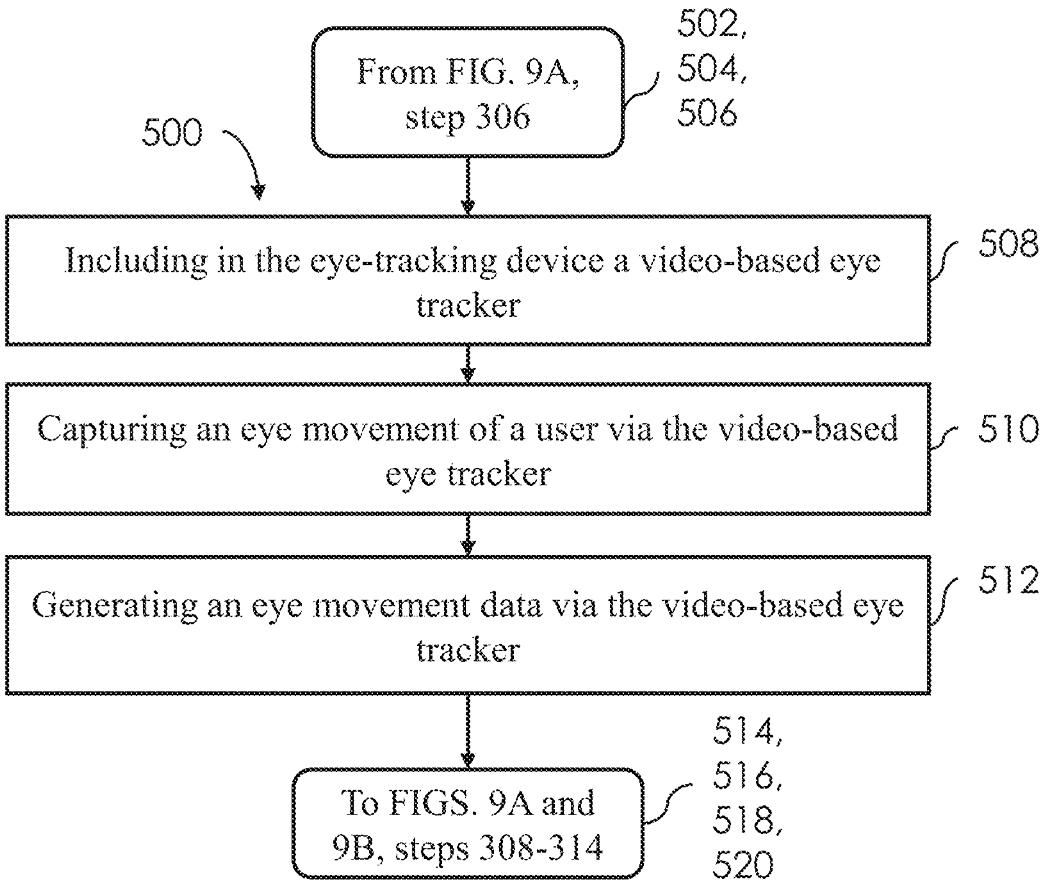
Figure 12:
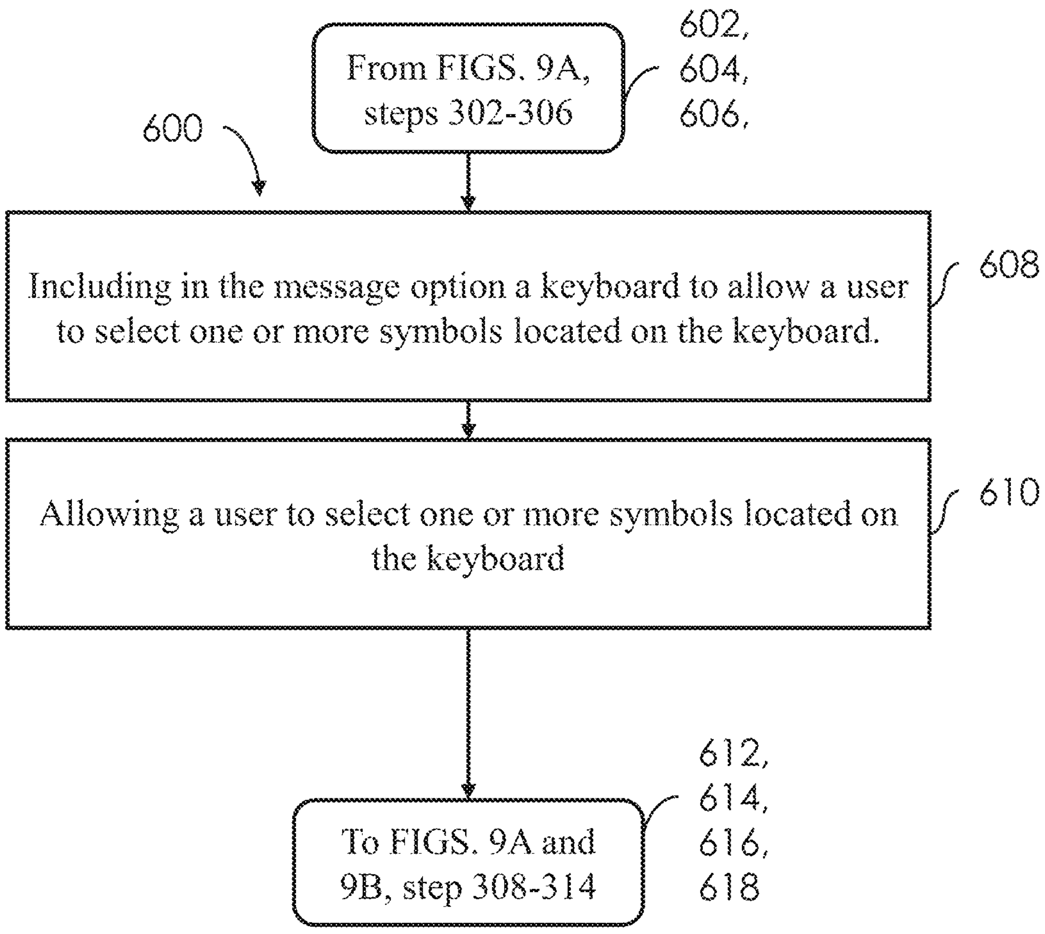
Figure 13:
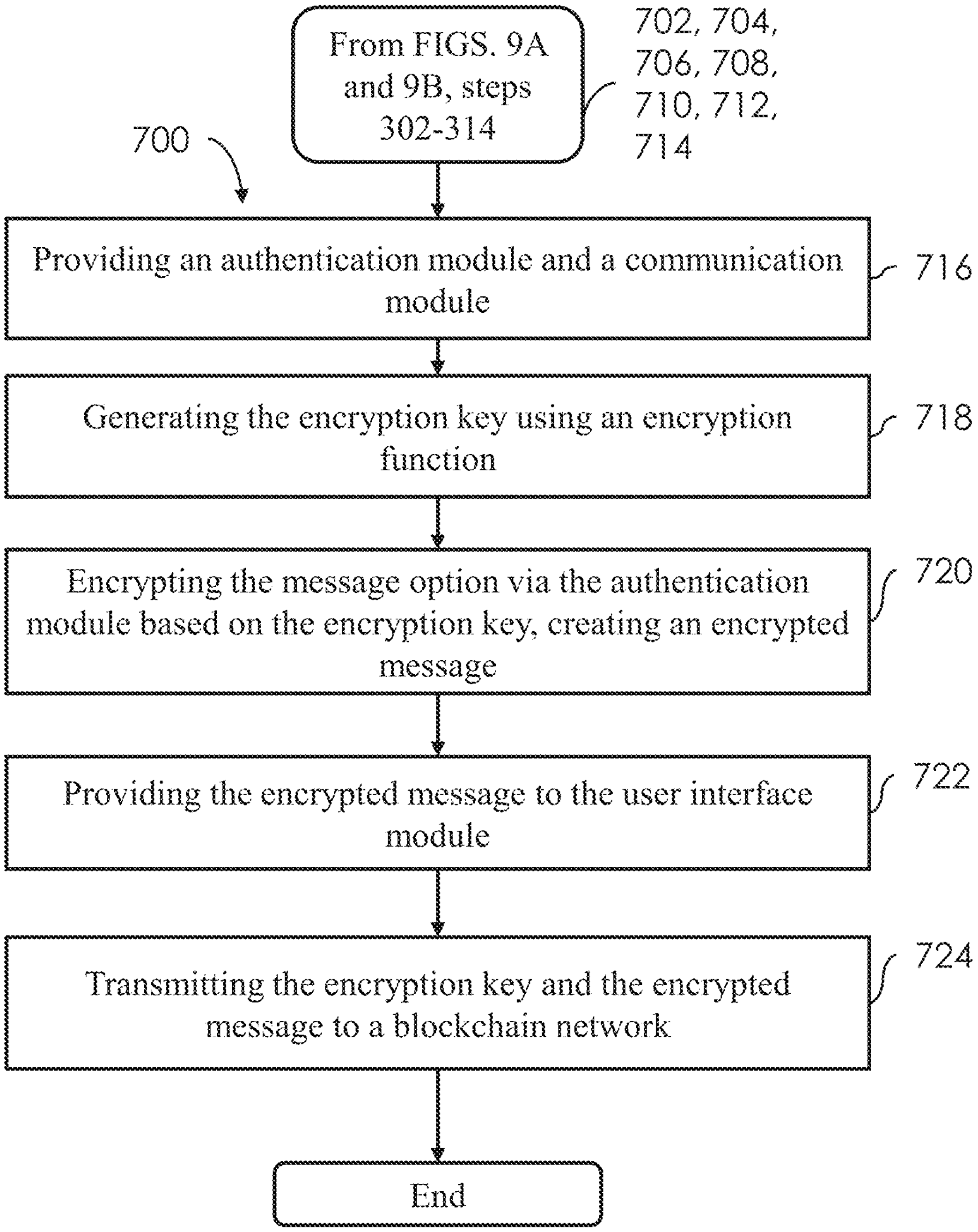
Figure 14:
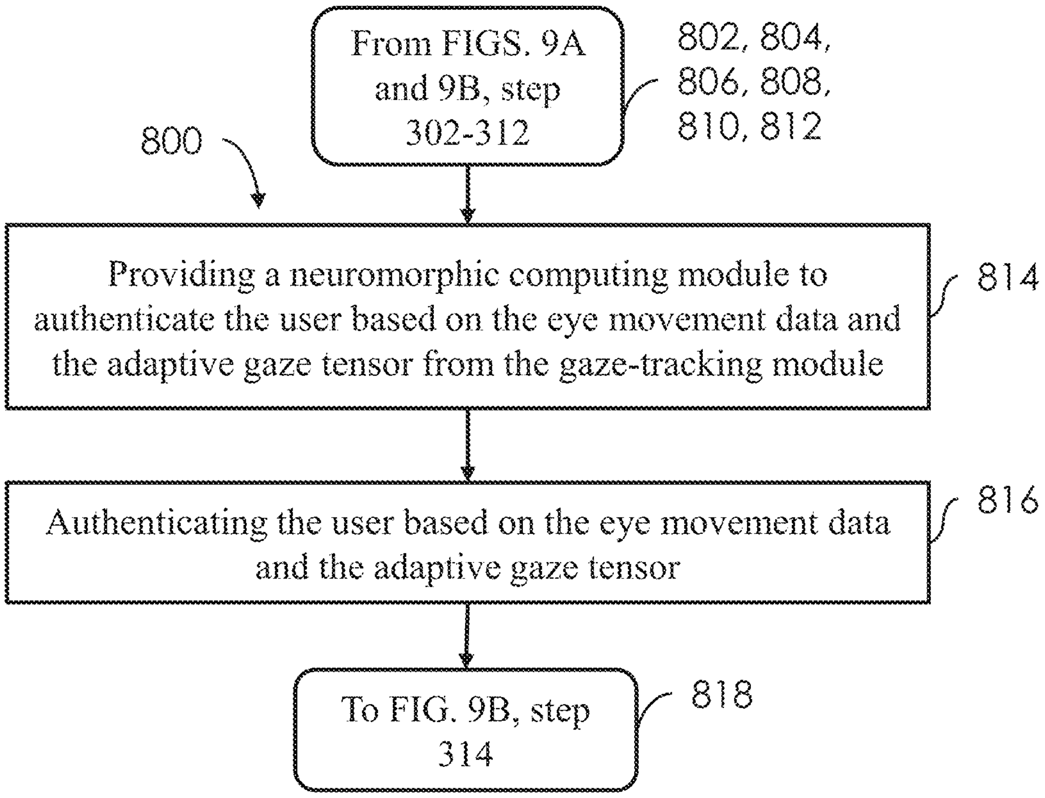
Figure 15:
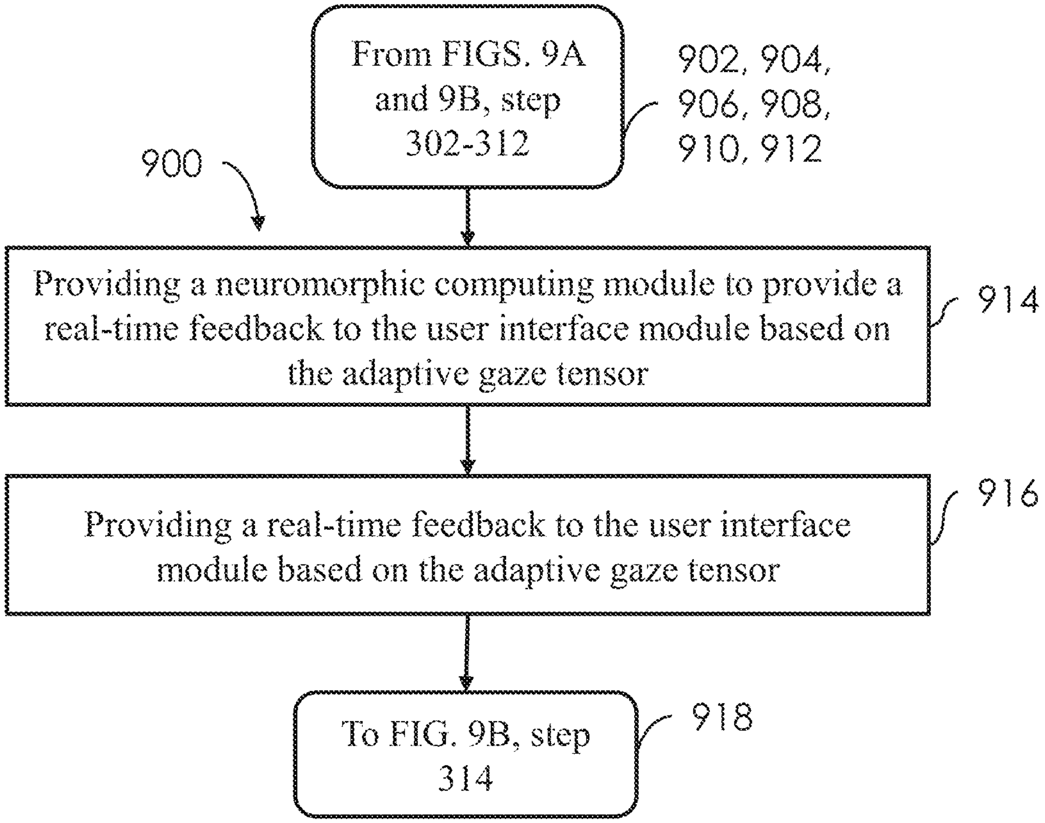

FIGS. 4A and 4B provide a sequence diagram illustrating operation of an embodiment of a system for secure optical encryption and authentication;

FIG. 5 is an illustration of a graphical user interface displayed in extended reality for an eye-tracking messaging application for secure optical encryption and authentication;

FIG. 6 is an illustration of a graphical user interface displayed in extended reality for the eye-tracking messaging application of FIG. 5 for secure optical encryption and authentication;

FIG. 7 is an illustration the graphical user interface displayed in extended reality for the eye-tracking messaging application of FIG. 5 for secure optical encryption and authentication;

FIG. 8 is a block diagram illustrating an embodiment of a system for secure optical encryption and authentication;

FIGS. 9A and 9B provide a flowchart illustrating an embodiment of a method for secure optical encryption and authentication;

FIG. 10 provides a flowchart extending from FIGS. 9A and 9B and further illustrates a method for secure optical encryption and authentication;

FIG. 11 provides a flowchart extending from FIGS. 9A and 9B and further illustrates a method for secure optical encryption and authentication;

FIG. 12 provides a flowchart extending from FIGS. 9A and 9B and further illustrates a method for secure optical encryption and authentication;

FIG. 13 provides a flowchart extending from FIGS. 9A and 9B and further illustrates a method for secure optical encryption and authentication;

FIG. 14 provides a flowchart extending from FIGS. 9A and 9B and further illustrates a method for secure optical encryption and authentication; and FIG. 15 provides a flowchart extending from FIGS. 9A and 9B and further illustrates a method for secure optical encryption and authentication.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially"

as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology provides a system 100 for improved security and reliability of user authentication systems by utilizing an eye-tracking algorithm combined with a neuromorphic computing technique, aspects of which are shown generally in accompanying FIGS. 1-8. This integration allows for a more nuanced and dynamic interpretation of biometric data, significantly reducing the risk of spoofing and unauthorized access while enhancing user convenience and privacy. A method 300 for secure optical encryption and authentication for a user within a digital space is also disclosed, aspects of which are shown in FIGS. 9A and 9B. Another method 400 for secure optical encryption and authentication is disclosed in FIG. 10. Another method 500 for secure optical encryption and authentication is disclosed in FIG. 11. And another method 600 for secure optical encryption and authentication is also disclosed in FIG. 12. Another method 700 for managing a secure optical encryption and authentication is also disclosed in FIG. 13. Yet another method 800 for secure optical encryption and authentication is disclosed in FIG. 14. And yet another method 900 for secure optical encryption and authentication is disclosed in FIG. 14.

The system 100 and methods 300, 400, 500, 600, 700, 800, and 900 allow for the integration of eye-tracking and neuromorphic computing for dynamic and adaptive security and authentication solutions. As shown in FIGS. 1-8, the system 100 may include an eye-tracking device 102 to capture an eye movement 104 of a user and generate an eye movement data 106. The system 100 may include a processor 108 and a memory 110 in communication with the processor 108. The memory 110 may include a user interface module 112 to display a message option 114 to the user and allow the user to select the message option 114. The memory 110 may include a database 116 to store the message option 114. The memory 110 may include a gaze-tracking module 118 to generate an adaptive gaze tensor 120 based on the message option 114 and the eye movement data 106. The memory 110 may include an artificial intelligence (AI) module 122 to assist the gaze-tracking module 118 in processing the adaptive gaze tensor 120. The memory 110 may include a neuromorphic computing module 124 to update the adaptive gaze tensor 120 when a change in behavior 126 is found in the eye movement data 106. The AI module 122 may also assist the neuromorphic computing module 124 in updating the adaptive gaze tensor 120. The memory 110 may include an authentication module 128 to generate an encryption key 130 based on the adaptive gaze tensor 120 and encrypt the message option 114 based on the encryption key 130, creating an encrypted message 132. The database 116 may store the adaptive gaze tensor 120, and the encryption key 130. The memory 110 may include a communication module 134 to receive and transmit the encryption key 130 and the encrypted message 132 to a blockchain network 136.

Figure 2:
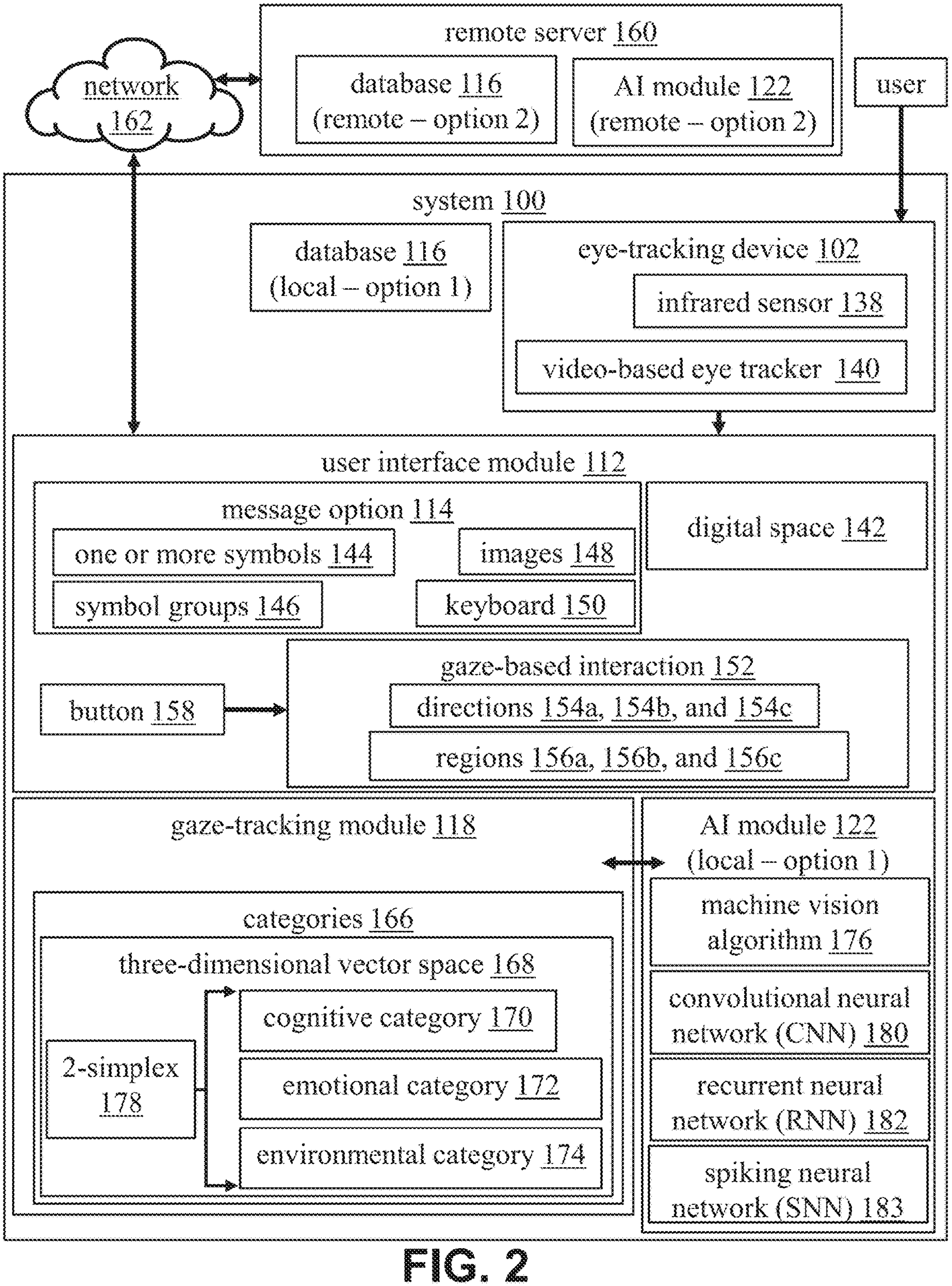
FIG. 2 is a block diagram illustrating an embodiment of a system for secure optical encryption and authentication.

The eye-tracking device 102 may include an infrared sensor 138, e.g., a sensor utilizing infrared oculography, which may be used to capture the eye movement data 106, as shown in FIG. 2. The infrared sensor 138 may provide high precision in detecting eye movement 104, contributing to the accuracy and reliability of the eye movement data 106, for example, measurements for pupil position, corneal reflection, and saccadic movements. Alternatively or in addition to the infrared sensor 138, the eye-tracking device 102 may include a video-based eye tracker 140, which may be used to capture the eye movement data 106. For example, the video-based eye tracker 140 may be an image capture device that may capture a single image, multiple images, or a stream of images, e.g., a camera that may capture and/or record visible light, such as webcam. One skilled in the art may employ one or more eye-tracking devices 102, including various types of eye-tracking devices 102, utilizing infrared and/or video analysis to determine eye positions and movements.

The processor 108 may be located on a local system 100 or a remote server 160 accessed via a network 162. The remote server 160 may be the central hub of the system 100, containing the processor 108 and memory 110 that store and execute the modules necessary for processing data. One skilled in the art will also appreciate that the processor 108 may include one or more processors and may process information and execute the various instructions or operations, as described herein. For example, the processor 108 may include a central processing unit (CPU), a microprocessor, a microcontroller, a system-on-a-chip 100, a digital signal processor (DSPs), field-programmable gate arrays (FPGAs), application-specific integrated circuits (ASICs), and/or a processor based on a multi-core processor architecture. One or more processors 108 may mean a single processor or multiple processors in a single processing unit, e.g., a central processing unit, or multiple processing units, e.g., a central processing unit and a graphics processing unit, or a central processing unit and a memory 110 manager. The processor 108 may include multiple processors 108 where one processor 108 is capable of executing one or more of the elements described in this disclosure, and a subsequent processor 108 or processors 108 may execute other elements as described herein, capable of executing all elements only in combination. One or more of the processors 108 may be remote from the at least one local system 100 server.

The memory 110 may store or otherwise include one or more databases 116. The memory 110 can include one or more memories and of any type suitable to the local application digital space 142 and can be implemented using any suitable volatile or nonvolatile data storage technology such as a semiconductor-based memory device, a magnetic memory device, an optical memory, a fixed memory, and/or a removable memory. For example, the memory 110 may include any combination of random-access memory (RAM), read only memory (ROM), static storage such as a magnetic or optical disk, a hard disk drive (HDD), or any other type of non-transitory machine or computer readable media.

Figure 1:
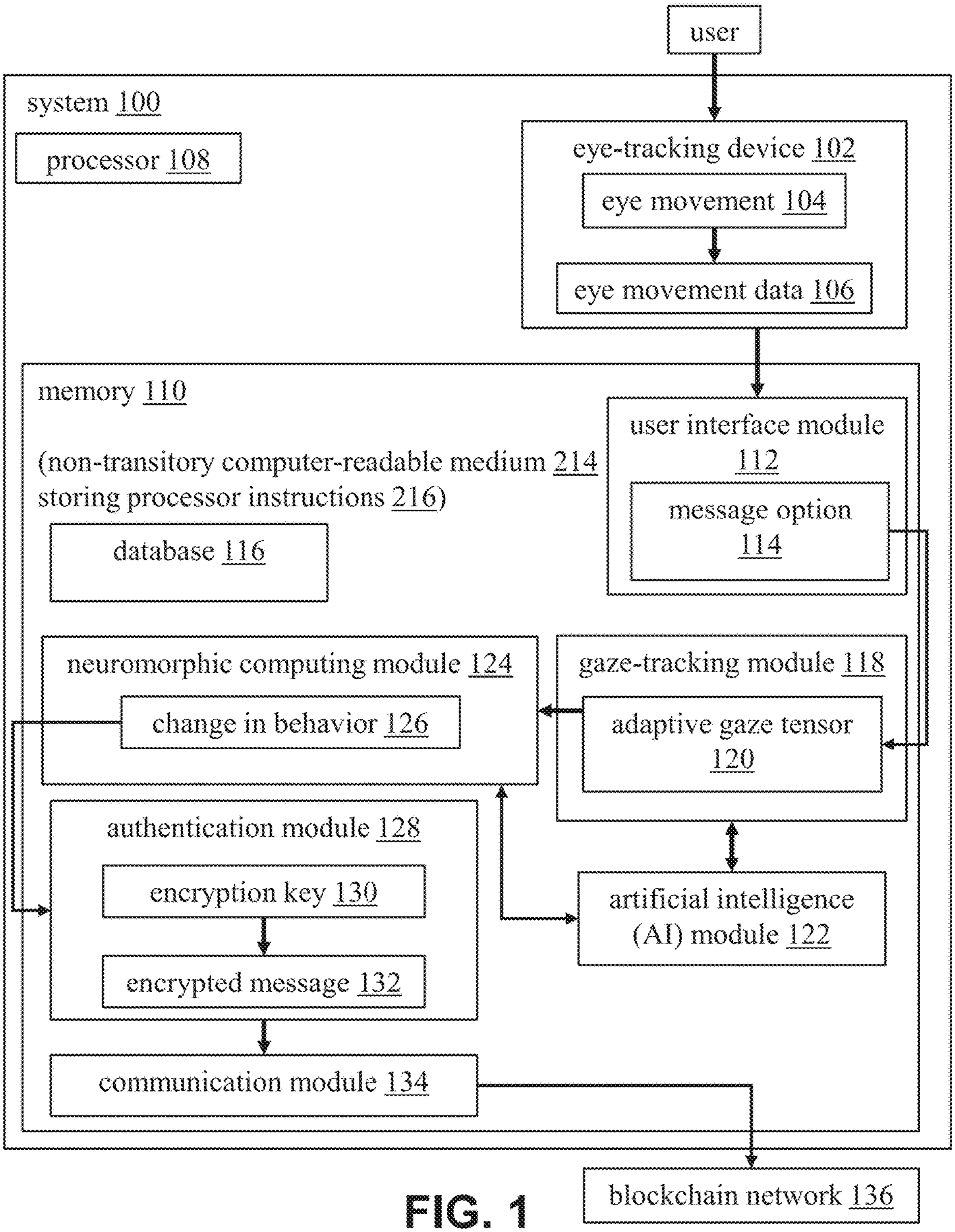
FIG. 1 is a block diagram illustrating an embodiment of a system for secure optical encryption and authentication.
Figure 3:
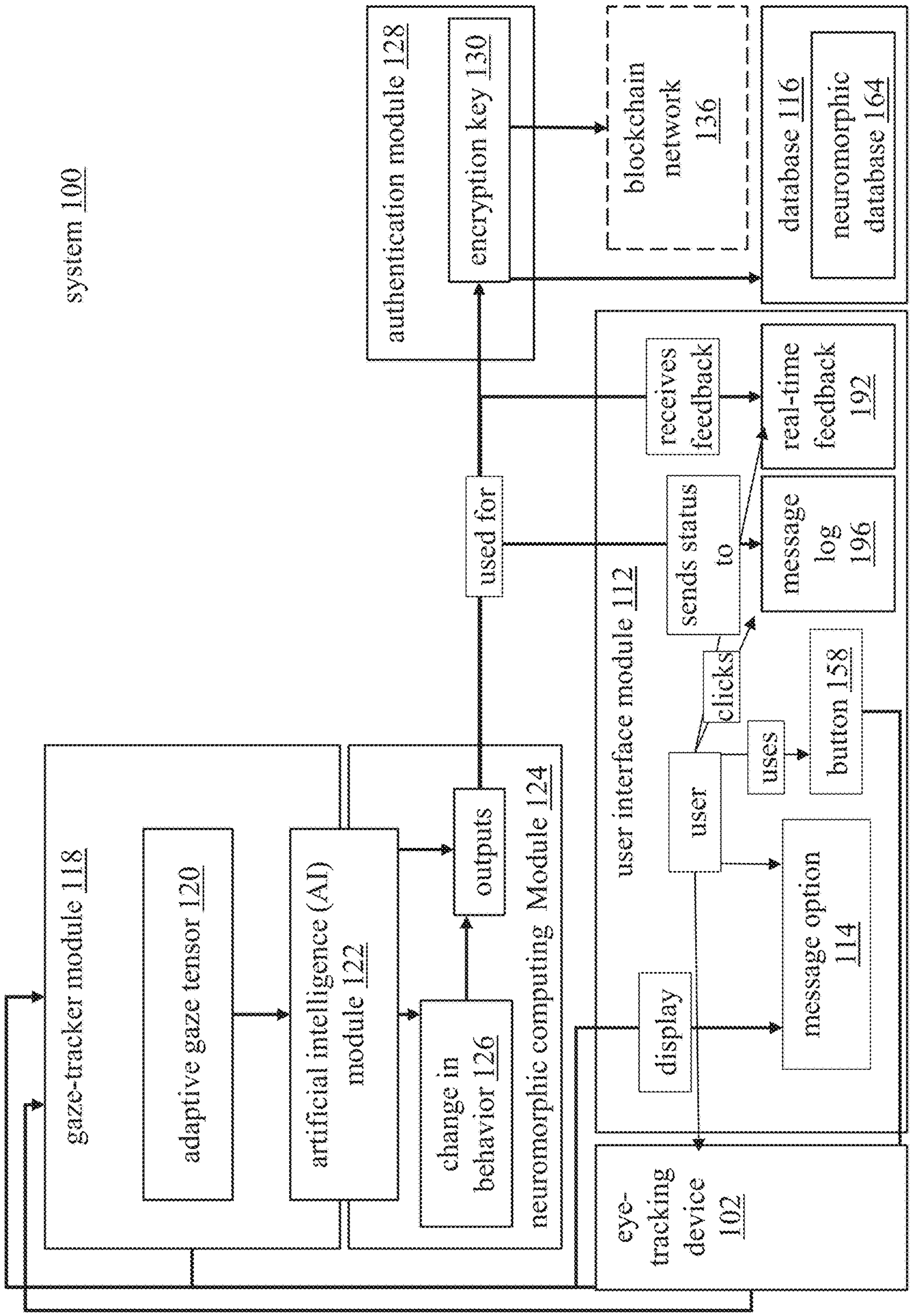
FIG. 3 is a block diagram illustrating an embodiment of a system for secure optical encryption and authentication.

As shown in FIGS. 1 and 3, the user interface module 112 may be configured to display a message option 114 to the user and allow the user to select the message option 114, enabling user interaction within a digital space 142. The user interface module 112 may serve as an interface for the system 100. The user interface module 112 may serve as the point of interaction between a user and the system 100 and interact with hardware including various output devices that may display a representation of the user interface module 112 for observation by the user, where such an output device may include, for example, one or more computer screen, speaker, tablet screen, or other view/audio port. The digital space 142 may be accessible to the user through the user interface module 112, where the digital space 142 may include, for example, a graphical user interface (e.g., an XR interface or XR space) that can be displayed in various ways, for example, via a desktop application, smartphone or mobile application, web interface, or API, and may interface with mobile SMS, social platforms, or messaging applications 208. The user interface module 112 may be designed to be intuitive and user-friendly, for example, with custom user preferences and accessibility requirements, allowing the user to easily select a message option 114.

The message option 114 may be displayed by the user interface module 112 as one or more symbols 144 in a graphical user interface, including the digital space 142. The one or more symbols 144 may may include various commands or characters, symbol groups 146, or images 148. The message option 114 may also include a keyboard 150 configured to allow a user to select one or more symbols 144 located on the keyboard 150. The message option 114 may be selected by the user clicking or pressing a button 158 to initiate the gaze-based interaction 152. The keyboard 150 may be designed to work seamlessly with the eye-tracking device 102, allowing users to select symbols 144 using the gaze-based interaction 152 of the user. For example, the message option 114 may provide a visually familiar interface for users, e.g. typewriter keys, phone dial pads, emojis, etc., facilitating case of use and interaction within the digital space 142.

The message option 114 may be selected by the eye movements 104 of the user. The user may select the message option 114 with a gaze-based interaction 152 with the user interface module 112, such as gazing at a particular symbol 144. The user may also select a message option 114 by the gaze-based interaction 152 that may include gazing at the screen and moving the gaze in one of multiple directions 154*a*, 154*b*, 154*c*, or focusing on one of multiple regions 156*a*, 156*b*, 156*c* of the screen where the message option 114 is associated with the one of multiple directions 154*a*, 154*b*, 154*c*, or the one of multiple regions 156*a*, 156*b*, 156*c*. It should be understood that moving the gaze in one of multiple directions 154*a*, 154*b*, 154*c* may be analyzed based on speed of the eye movement 104, and focusing the gaze one of multiple regions 156*a*, 156*b*, 156*c* of the screen may be analyzed based on a length of time the gaze is focused on the one of multiple regions 156*a*, 156*b*, 156*c*.

As shown in FIG. 2, for example, the gaze-based interaction 152 may include the use of a machine vision algorithm 176 library, eye-tracking software, or face tracking software that employ tracking points superimposed on an image or video of the eyes and face of a user. As shown in FIGS. 5-7, for example, tracking points such as eye and facial landmarks may be utilized to identify the face, key features, eyes, iris and movements in 3D, tracking eye movements when the head of user is stationary or when the user is moving. The detection may also capture eye movements during lighting changes or when the face of the user is partially obstructed. These eye and facial landmarks may be grouped to construct a digital overlay or superimposition representing the eye, iris, or other facial feature of the user, tracking the eye movement of the user in real-time for generating eye movement data.

As shown in FIG. 1, the database 116 may receive and store the message option 114, the adaptive gaze tensor 120, and the encryption key 130. The storage of these elements may facilitate the retrieval and use of the encryption key 130 and the adaptive gaze tensor 120 for updating the adaptive gaze tensor 120 and authenticating the user. The database 116 may include a local database 116 as shown in FIG. 2, option 1, a database 116 saved on a remote server 160 and accessed via a network 162, as shown in FIG. 2, option 2, such as a cloud server, or a combination of a local and a remote database 116, as required by the system 100. The database 116 may include a neuromorphic database 164, as shown in FIG. 3, to store the adaptive gaze tensor 120. The database 116 may also include, for example, a vector database 116 or vector store for storing vector embeddings, e.g. flexible, meaning-based, probabilistic numerical representations of data that capture semantic meaning, allowing the system 100 to compare similarities between different types of data. The database 116 may also include a relational database 116, for example, data saved in a structured form, e.g. a structured query language (SQL) table, a comma-separated values (CSV) file, or in JavaScript object notation (JSON), or a JSON-related object or map, or object storage, or other forms of tabular input. The database 116 may also include a general storage database 116 to store, for example, unstructured data such as HTML, text, raw transcripts, chat logs, images 148, audio files, or social media 206 posts. It should be understood that the database 116 may employ a separate or secondary encryption to protect sensitive information, ensuring that the stored data remains secure and confidential.

With reference to FIGS. 1 and 2, the gaze-tracking module 118 may receive the message option 114 from the user interface module 112 and the eye movement data 106 from the eye-tracking device 102. Based on the message option 114 and the eye movement data 106, the gaze-tracking module 118 may generate an adaptive gaze tensor 120. The adaptive gaze tensor 120 may be a dynamic representation of the gaze-based interaction 152 of the user, which may be used to enhance the security and adaptability of one or more encryption processes. The adaptive gaze tensor 120 may include one or more categories 166 represented in a three-dimensional vector space 168. The three-dimensional vector space 168 may be represented as the following:

$$V = \mathbb{R}^3 V \text{ over the field of real numbers } \mathbb{R}.$$

The standard basis of V is defined as:

$$e_{cog} = (1, 0, 0), \text{ representing a cognitive category 170,} \quad (1)$$

$$e_{emo} = (0, 1, 0), \text{ representing an emotional category 172, and} \quad (2)$$

$$e_{env} = (0, 0, 1), \text{ representing an environmental category 174.} \quad (3)$$

A gaze-based interaction 152 at time t, denoted g(t), may be a vector in this space:

$$g(t) \in \{e_{cog}, e_{emo}, e_{env}\}, \quad (4)$$

As shown in Eqs. (1-4), the three-dimensional vector space 168 includes a cognitive category 170, an emotional category 172, and an environmental category 174. Each of these categories 166 may be captured at discrete times, as shown in Eq. (4), indicating the category 172 into which the gaze-based interaction 152 is classified at discrete time steps t=1, 2, etc. The three-dimensional vector space 168 may be derived from the eye movement data 106 processed through a machine vision algorithm 176. For example, the machine vision algorithm 176 may be informed by ophthalmological techniques, to ensure precision in the identification of the adaptive gaze tensor 120. The adaptive gaze tensor 120 at time t may be, for example, a vector $\omega(t) \in \Delta^2 \subset V$, where $\Delta^2$ is a 2-simplex 178 defined as:

Adaptive gaze tensor 120: 2-simplex 178:

$$\Delta^2 = \{w \in V\Delta^2 = \left\{\omega \in v \middle| \sum_{i=1}^{3} \omega_i = 1,\ w_i \geq 0\right\} \quad (5)$$

$$\omega(t) = (\omega_{cog}(t), \omega_{emo}(t), \omega_{env}(t)) \quad (6)$$

Eq. (6) may represent a probability distribution over the three-dimensional vector space 168, with $\omega_{cog}(t)$, $\omega_{emo}(t)$, $\omega_{env}(t)$ representing weights for the cognitive category 170, the emotional category 172, and the environmental category 174, respectively, at time t.

The gaze-tracking module 118 may utilize the AI module 122 to process the adaptive gaze tensor 120. The AI module 122 may process the adaptive gaze tensor 120 with the machine vision algorithm 176. The AI module 122 may employ the machine vision algorithm 176 through, for example, a convolutional neural network (CNN) 180, a recurrent neural network (RNN) 182, or a spiking neural network (SNN) 183 to process the adaptive gaze tensor 120 in real time. The AI module 122 may include a local AI module 122, as shown in FIG. 3, option 1, or may utilize a remote AI module 122 via a network 162 as shown in FIG. 3, option 2. The AI module 122 may include, for example, various machine vision algorithm 176 libraries such as Mediapipe® Solutions, PyGaze™ Eye-Tracking Software, or OpenCV® Computer Vision Library, used in biometric or eye gaze tracking in order to facilitate this process. One of ordinary skill in the art may employ various AI-based architecture as required by the system 100.

As shown in FIG. 8, the neuromorphic computing module 124 may receive the eye movement data 106 and the adaptive gaze tensor 120 from the gaze-tracking module 118. The neuromorphic computing module 124 may be configured to update the adaptive gaze tensor 120, including another, e.g. existing, adaptive gaze tensor 120 from the database 116 representing a previous eye movement data 106 from the user, when the change in behavior 126 is detected in the eye movement data 106. The weights as shown in Eqs. (1-3) may be dynamically updated to reflect the change in behavior 126 based on the cognitive category 170, the emotional category 172, and the environmental category 174. The neuromorphic computing module 124 may update ω(t) by an update rule 184, defined as a function:

$$f: V \times \{e_{cog}, e_{emo}, e_{env}\} \rightarrow V: \quad (7)$$

$$\omega(t+1) = f(\omega(t), g(t)) \quad (8)$$

A specific instantiation of the update rule 184 may utilize an exponential moving average 186, followed by projection onto the 2-simplex 178, for example:

$$\omega(t+1)=\Pi_{\Delta}[(1-\alpha)\omega(t)+\alpha g(t) \tag{9}$$

where:

$\alpha\in(0,1]$ represents a learning rate 188 controlling the adaptation speed, adjusted based on cognitive and emotional aspects derived from, for example, eye movement desensitization and reprocessing (EMDR) and rapid eye movement (REM) data, and $\Pi_{\Delta}$ denotes an orthogonal projection onto $\Delta^2$ ensuring:

$$\sum_{i=1}^{3}\omega_i(t+1)=1 \text{ and} \tag{10}$$

$$\omega_i(t+1)\geq 0 \tag{11}$$

The formulation of Eqs. (10-11) may allow ω(t) as shown in Eq. (6) to evolve dynamically, reflecting changes in the change in behavior 126 over time as processed by the neuromorphic computing module 124. In other words, the user may calibrate the system 100 with a gaze-based interaction 152, establishing a baseline ω(t) using the update rule 184. It should be appreciated that the AI module 122 may be trained on extensive gaze datasets in order to assist the neuromorphic computing module 124 in updating ω(t) dynamically as shown in Eq. (6), adapting to a change in behavior 126 of the user. The learning rate 188 *a* can be tuned using, for example, aspects from EMDR therapy sessions or REM-like stimulation, enhancing the adaptability of the adaptive gaze tensor 120 to user-specific cognitive patterns. One skilled in the art may employ EMDR, a therapeutic technique involving guided eye movements 104, or REM, linked to memory consolidation of the user during sleep, to inform the cognitive processing of the gaze-based interaction 152. For example, EMDR may adapt the system 100 to emotional states, while REM may augment a memory-related pattern of the user. The neuromorphic computing module 124 may adjust the learning rate 188 *a* in the update rule 184, as shown in Eq. (9), for example, based on cognitive load or emotional state inferred from the gaze-based interaction 152, personalizing ω(t) updates. It should also be appreciated that the neuromorphic computing module 124 may mimic the neural architecture of the user to efficiently process the eye movement data 106 and the adaptive gaze tensor 120, providing security without an invasive brain computation interface (BCI) 190, motivating the user to improve cognitive processes, e.g., via visual optical stimuli and electroencephalography (EEG) data monitoring, and information classification, typing, or transmission.

Alternatively, the system 100 may be integrated into a BCI 190, for example, to enhance cognitive processing capabilities while maintaining the non-invasive advantages of eye-tracking based authentication. For example, the integration with the BCI 190 may enable advanced neural signal processing, allowing for enhanced pattern recognition and more precise authentication protocols. It should be appreciated that combining the system 100 with the BCI 190 may provide additional layers of security through multi-modal biometric verification, where the eye movement data 106 may be correlated with neural activity for more accurate user identification and secure data transmission. The neuromorphic computing module 124 may store the adaptive gaze tensor 120 in a neuromorphic database 164 for future use in updating the adaptive gaze tensor 120 based on the change in behavior 126 of the user.

The neuromorphic computing module 124 may also be configured to provide real-time feedback 192 to the user interface module 112 based on the adaptive gaze tensor 120. The real-time feedback 192 may include information such as the message option 114 selected by the user, an authentication status 194, or a message log 196 to the display in the digital space 142. By providing real-time feedback 192, it should be appreciated that the system 100 may enhance user interaction and engagement, create a more immersive and responsive experience, and offer a hands-free, secure communication paradigm. In other words, the adaptive gaze tensor 120 may replace tactile inputs, e.g., keystrokes on a tactile keyboard, by mapping eye movements 104 to the message option 114, such as one or more symbols 144 or symbol groups 146. For example, the user may compose a message by gazing at the screen and moving the gaze in one of multiple directions 154*a*, 154*b*, 154*c*, or focusing on one of multiple regions 156*a*, 156*b*, 156*c* of the screen. The hands-free nature of the system 100 may enhance accessibility for a user with motor impairments and may reduce vulnerabilities such as keylogging by unauthorized third parties.

The neuromorphic computing module 124 may authenticate the user based on the eye movement data 106 and the adaptive gaze tensor 120 from the gaze-tracking module 118. Determining the authentication status 194 of a user may provide a non-invasive method of verifying user identity, e.g., utilizing biometric data derived from eye movements 104. The neuromorphic computing module 124 may use the adaptive gaze tensor 120 in conjunction with the encryption key 130 to enhance the reliability and security of the authentication process.

As shown in FIG. 8, the authentication module 128 may receive the adaptive gaze tensor 120 from the neuromorphic computing module 124. This module may be configured to generate an encryption key 130 based on the adaptive gaze tensor 120. The encryption key 130 may be used to encrypt the message option 114, creating an encrypted message 132. The authentication module 128 may also provide the encrypted message 132 to the user interface module 112, enabling secure communication within the digital space 142. The authentication module 128 may be further configured to generate the encryption key 130 using an encryption function 198. The encryption function 198 may include a dual space representation 200, a bilinear map 202, or a combination of the dual space representation 200 and the bilinear map 202. It should be appreciated that the encryption function 198 may provide a robust framework for generating the encryption key 130, utilizing the adaptive nature of the adaptive gaze tensor 120 to enhance security. For example, the dual space representation 200 may include the following:

Let V* be the dual space of V, consisting of all linear functionals $\phi: V\rightarrow\mathbb{R}$.

For each user, a secret linear functional $\phi\in V^*$ is defined, represented in coordinates as:

$$\phi(v)=\langle v, s\rangle=v_1s_1+v_2s_2+v_3s_3, \tag{12}$$

where $s=(s_1, s_2, s_3) \in V$ is a user-specific secret vector, and $\langle \cdot, \cdot \rangle$ denotes the standard inner product on $\mathbb{R}^3$. The encryption key 130 at time t is computed as:

$$k(t) = \phi(\omega(t)) = \langle \omega(t), s \rangle. \quad (13)$$

As shown in Eq. (13), the key $k(t) \in \mathbb{R}$ may utilize the adaptive nature of ω(t) and the secrecy of ϕ (via s) to generate a unique, time-varying encryption parameter.

The bilinear map 202 may include the following aspects. To generalize the framework of the encryption function 198, an additional vector space 204 as $W=\mathbb{R}^m$ may be introduced, for example, as representing user-specific or contextual data (e.g., cognitive profiles or temporal contexts derived from REM data), where m is a positive integer. The bilinear map 202 may be defined as:

$$B: V \times W \rightarrow \mathbb{R}, \quad (14)$$

such that for v∈V and w∈W, B(v, ω) may be linear in each argument when the other is fixed. For a secret s∈W, the encryption key 130 becomes:

$$k(t) = B(\omega(t), s). \quad (15)$$

This bilinear map 202 may enhance flexibility, allowing the system 100 to incorporate additional dimensions of data into the key generation process. The additional vector space 204 of the bilinear map 202 may ensure that B may be represented via the tensor product space V⊗W, with B corresponding to an element in the dual space (V⊗W). This structure may support integration with neural signals for the BCI 190, where W may represent brainwave data. In other words, integration with the BCI 190 may be supported by the bilinear map 202, which may incorporate neural signals into W, refining k(t). For example, brainwave data may be represented as a vector in $W=\mathbb{R}^m$, allowing the system 100 to combine the gaze-based interaction 152 and selected message option 114 for thought-based communication, further eliminating the need for physical interaction.

The authentication module 128 may also encrypt the message option 114 based on the encryption key 130, creating an encrypted message 132. The encrypted message 132 may be provided to the user interface module 112, ensuring that the communication remains secure and protected from unauthorized access. The encryption process utilized by the authentication module 128 may be designed to be efficient and adaptable, accommodating variations in the change in behavior 126 and environmental conditions. It should be appreciated that the dual space representation 200 and the bilinear map 202 may provide a mathematical foundation to ensure that the gaze-based interaction 152 of each user may be uniquely represented and securely transformed into the encryption key 130.

The communication module 134 may manage the transmission and reception of the encryption key 130 and the encrypted message 132. The communication module 134 may facilitate secure data exchange with external systems, such as a blockchain network 136 for encryption key 130 storage or verification. Securing the encryption key 130 and the encrypted message 132 on the blockchain network 136 may provide a decentralized and secure method for storing and transmitting messages within social media 206 and messaging applications 208, e.g. Signal® messaging service or GroupMe® mobile group messaging. The blockchain network 136 may provide a decentralized, immutable ledger 210 for storing and transmitting the encryption key 130 k(t) and the encrypted message 132. For example, each k(t) is hashed and recorded on the blockchain, ensuring tamper-proof communication, and authentication may be automated via a smart contract, verifying user identity via ω(t) before granting access, bolstering resilience against attacks. The mathematical uniqueness of k(t), derived from ϕ(ω(t)) or B(ω(t), s), ensures secure a blockchain transaction 212. As shown in Eq. (13), the key $k(t) \in \mathbb{R}$ may also utilize time-varying encryption which may be stored and verified on the blockchain for enhanced security. The blockchain transaction 212 may also secure the encrypted message 132 with decryption requiring synchronized gaze input from the recipient, verified through ω(t). The blockchain transaction 212 may, for example, utilize various mathematical theories, e.g. knot theory, in the algorithmic protocol as shown in Eqs. (12-15). It should be appreciated that visual cues mimicking REM may enhance user engagement, embedding cognitive uniqueness into k(t) and strengthening the encryption process.

As shown in FIGS. 9A and 9B, a method 300 for secure optical encryption and authentication for a user within a digital space 142 is provided. The method 300 may include a step 302 of providing an eye-tracking device 102 to capture an eye movement 104 of a user and generate an eye movement data 106, a processor 108, and a memory 110 in communication with the processor 108. The memory 110 may include a user interface module 112 to display a message option 114 to the user and allow the user to select the message option 114. The memory 110 may include a database 116 to store the message option 114, the adaptive gaze tensor 120, and the encryption key 130. The memory 110 may include a gaze-tracking module 118 to generate an adaptive gaze tensor 120 based on the message option 114 and the eye movement data 106. The memory 110 may include a neuromorphic computing module 124 to update the adaptive gaze tensor 120 when a change in behavior 126 is found in the eye movement data 106. The memory 110 may include an authentication module 128 to generate an encryption key 130 based on the adaptive gaze tensor 120 and encrypt the message option 114 based on the encryption key 130, creating an encrypted message 132.

The method 300 may include a step 304 of capturing the eye movement 104 of the user and generating the eye movement data 106 via the eye-tracking device 102. The method 300 may include a step 306 of displaying the message option 114 to the user and allowing the user to select the message option 114 via the user interface module 112. The method 300 may include a step 308 of storing the message option 114, the adaptive gaze tensor 120, and the encryption key 130 in the database 116. The method 300 may include a step 310 of receiving the message option 114 from the user interface module 112 and the eye movement data 106 from the eye-tracking device 102 and generating an adaptive gaze tensor 120 based on the message option 114 and the eye movement data 106 via gaze-tracking module 118. The method 300 may include a step 312 of receiving the eye movement data 106 and the adaptive gaze tensor 120 from the gaze-tracking module 118 and updating the adaptive gaze tensor 120 when a change in behavior 126 is found in the eye movement data 106 via the neuromorphic computing module 124. The method 300 may include a step 314 of receiving the adaptive gaze tensor 120 from the neuromorphic computing module 124 and generating an encryption key 130 based on adaptive gaze tensor 120 via the authentication module 128.

As shown in FIG. 10, a method 400 for secure optical encryption and authentication for a user within a digital space 142 is provided. The method 400 may include steps 302-306 of method 300 (as steps 402-406 respectively). The method 400 may include a step 408 of including in the eye-tracking device 102 an infrared sensor 138. The method 400 may include a step 410 of capturing an eye movement 104 of a user via the infrared sensor 138. The method 400 may include a step 412 of generating an eye movement data 106 via the infrared sensor 138. The method 400 may include steps 308-314 of method 300 (as steps 414-420 respectively).

As shown in FIG. 11, a method 500 for secure optical encryption and authentication for a user within a digital space 142 is provided. The method 500 may include steps 302-306 of method 300 (as steps 502-506 respectively). The method 500 may include a step 508 of including in the eye-tracking device 102 a video-based eye tracker 140. The method 500 may include a step 510 of capturing an eye movement 104 of a user via the video-based eye tracker 140. The method 500 may include a step 512 of generating an eye movement data 106 via the video-based eye tracker 140. The method 500 may include steps 308-314 of method 300 (as steps 514-520 respectively).

As shown in FIG. 12, a method 600 for secure optical encryption and authentication for a user within a digital space 142 is provided. The method 600 may include steps 302-306 of method 300 (as steps 602-606 respectively). The method 600 may include a step 608 of including in the message option 114 a keyboard 150 to allow a user to select one or more symbols 144 located on the keyboard 150. The method 600 may include a step 610 of allowing a user to select one or more symbols 144 located on the keyboard 150. The method 500 may include steps 308-314 of method 300 (as steps 612-618 respectively).

As shown in FIG. 13, a method 700 for secure optical encryption and authentication for a user within a digital space 142 is provided. The method 700 may include steps 302-314 of method 300 (as steps 702-714 respectively). The method 700 may include a step 716 of providing an authentication module 128 that may generate the encryption key 130 using a encryption function 198, encrypt the message option 114 based on the encryption key 130 thereby creating an encrypted message 132, and provide the encrypted message 132 to the user interface module 112, and a communication module 134 that may receive and transmit the encryption key 130 and the encrypted message 132 to a blockchain network 136. The encryption function 198 may include a dual space representation 200, a bilinear map 202, or a combination of the two. The method 700 may include a step 718 of generating the encryption key 130 using an encryption function 198. The method 700 may include a step 720 of encrypting the message option 114 via the authentication module 128 based on the encryption key 130, creating an encrypted message 132. The method 700 may include a step 722 of providing the encrypted message 132 to the user interface module 112. The method 700 may include a step 724 of transmitting the encryption key 130 and the encrypted message 132 to a blockchain network 136.

As shown in FIG. 14, a method 800 for secure optical encryption and authentication for a user within a digital space 142 is provided. The method 800 may include steps 302-312 of method 300 (as steps 802-812 respectively). The method 800 may include a step 814 of providing a neuromorphic computing module 124 to authenticate the user based on the eye movement data 106 and the adaptive gaze tensor 120 from the gaze-tracking module 118. The method 800 may include a step 816 of authenticating the user based on the eye movement data 106 and the adaptive gaze tensor 120. The method 800 may include step 314 of method 300 (as step 818 respectively).

As shown in FIG. 15, a method 900 for secure optical encryption and authentication for a user within a digital space 142 is provided. The method 900 may include steps 302-312 of method 300 (as steps 902-912 respectively). The method 900 may include a step 914 of providing a neuromorphic computing module 124 to provide a real-time feedback 192 to the user interface module 112 based on the adaptive gaze tensor 120. The method 900 may include a step 916 of providing a real-time feedback 192 to the user interface module 112 based on the adaptive gaze tensor 120. The method 900 may include step 314 of method 300 (as step 918 respectively).

The system 100 may include a non-transitory computer-readable medium 214 storing processor instructions 216 for secure optical encryption and authentication for a user. When executed by a processor 108, the processor instructions 216 may cause the processor 108 to display a message option 114 to the user. The processor instructions 216 may cause the processor 108 to allow the user to select the message option 114. The processor instructions 216 may cause the processor 108 to capture an eye movement 104 of the user. The processor instructions 216 may cause the processor 108 to generate an eye movement data 106. The processor instructions 216 may cause the processor 108 to generate an adaptive gaze tensor 120 based on the message option 114 and the eye movement data 106. The processor instructions 216 may cause the processor 108 to update the adaptive gaze tensor 120 when a change in behavior 126 is found in the eye movement data 106. The processor instructions 216 may cause the processor 108 to generate an encryption key 130 based on adaptive gaze tensor 120.

Advantageously, the present technology may address the limitations of authentication systems by integrating eye-tracking technology with neuromorphic computing and blockchain encryption. The adaptive gaze tensor 120 may enable dynamic and secure key generation for optical encryption and authentication, enhancing security by utilizing biometric data derived from eye movements 104, which may be difficult to replicate or forge, and improve user interaction and cognitive engagement through a system 100 that is both intuitive and interactive. The adaptability of the system 100 to user behavior and environmental conditions, combined with the mathematical robustness of the adaptive gaze tensors 120, may ensure a high level of security against spoofing and unauthorized access. By providing a secure, user-friendly platform that utilizes natural neurological processes for data encryption and messaging, the present technology may overcome the challenges of cumbersome and less secure systems 100, offering a solution that may be adaptable to the digital space 142, and potential broader mobile and on-chain applications. The removal of tactile inputs may pave the way for non-invasive alternatives to a BCI 190, positioning the present technology as a transformative tool for secure communication.

EXAMPLES

Example embodiments of the present technology are provided with reference to the several figures including FIGS. 1-15 enclosed herewith.

Example 1: Encrypting Messages on a Social Messaging Application 208

In a social messaging application 208 operating within a digital space 142, the system 100 may facilitate secure message encryption. The eye-tracking device 102 may be employed to capture the eye movement 104 of the user, generating eye movement data 106 that may serve as input for the system 100, as shown in FIG. 5. The user interface module 112 may display a one or more symbols 144 within the digital space 142, allowing the user to select the message option 114 through the gaze-based interaction 152, initiating the gaze-based interaction 152 by clicking on a button 158 and looking in a certain direction 154, as shown in FIG. 6. The gaze-tracking module 118 may receive the selected message option 114 and eye movement data 106, generating an adaptive gaze tensor 120 to enhance encryption security.

The neuromorphic computing module 124 may process the eye movement data 106 and adaptive gaze tensor 120, updating the adaptive gaze tensor 120 when a change in behavior 126 is detected. The authentication module 128 may generate the dynamic encryption key 130 based on the adaptive gaze tensor 120, ensuring that each selected message option 114 is securely encrypted. The authentication module 128 may use the encryption key 130 to encrypt the message option 114, creating an encrypted message 132 that is transmitted securely within the social messaging application 208, displayed as a message log 196, as shown in FIG. 7. The real-time feedback 192 may be provided to the user interface module 112, indicating the selected message option 114 and the status of the encryption and authentication process.

The communication module 134 may manage the secure transmission of the encrypted message 132 to external systems such as a blockchain network 136, for secure storage and verification. The blockchain's decentralized nature may ensure that the message remains tamper-proof and verifiable. The system 100 may adapt to variations in the biometric data of the user, maintaining consistent security levels despite changes in the digital space 142. The adaptability the system 100 may enhance the user's experience, providing a seamless and secure communication method.

The memory 110 may securely store the message option 114, adaptive gaze tensor 120, and encryption key 130 in the database 116, employing secondary encryption to protect sensitive information. The neuromorphic computing module 124 may facilitate the retrieval and use of the encryption key 130 and adaptive gaze tensor 120 as needed. The system 100 may be designed to operate efficiently within the digital space 142, utilizing XR hardware capabilities such as a virtual reality (VR) headset to enhance immersion and usability.

Overall, the system 100 may provide a non-invasive method of secure communication by applying the biometric properties of eye-tracking and neuromorphic computing. By generating the dynamic encryption key 130 based on the adaptive gaze tensor 120, the system 100 may enhance data security and user interaction within social messaging applications 208. The use of blockchain technology may further ensure the integrity and confidentiality of transmitted encrypted messages 132, addressing the limitations of other encryption methods, and offering a more secure and user-friendly solution for digital communication.

Example 2: Secure Messaging in a Virtual Reality Gaming Environment

A user wearing a virtual reality (VR) headset may engage in secure messaging with other players through the system 100. The eye-tracking device 102 integrated within the VR headset may capture the eye movements 104 of the user and generate eye movement data 106. The user interface module 112 may display a virtual keyboard 150 within the VR game environment, allowing the user to select message options 114 through gaze-based interaction 152. The user may compose messages by focusing their gaze on specific symbols 144 or symbol groups 146 displayed in the digital space 142.

When composing a message, the gaze-tracking module 118 may receive the selected message options 114 and eye movement data 106, generating an adaptive gaze tensor 120. The neuromorphic computing module 124 may process this data and update the adaptive gaze tensor 120 when changes in behavior 126 may be detected. The authentication module 128 may generate a dynamic encryption key 130 based on the adaptive gaze tensor 120, which may be used to encrypt the message option 114 into an encrypted message 132. The communication module 134 may then transmit this encrypted message 132 to other players through the VR game environment.

When receiving messages, the system 100 may provide real-time feedback 192 through the user interface module 112, displaying the message log 196 within the VR game environment. The blockchain network 136 may ensure that all communications between players remain secure and tamper-proof through the immutable ledger 210. The system 100 may adapt to variations in the biometric data of the user while maintaining consistent security levels during gameplay. The memory 110 may securely store all message options 114, adaptive gaze tensors 120, and encryption keys 130 in the database 116, employing secondary encryption to protect sensitive information between gaming sessions.

Example 3: Authentication in an Online Banking Application

A user may authenticate secure banking transactions through the system 100 using eye-tracking based security. The eye-tracking device 102 may capture the eye movements 104 of the user and generate eye movement data 106 while accessing their online banking interface. The user interface module 112 may display transaction options as message options 114 within the digital space 142. The user may select and confirm transactions through gaze-based interaction 152, such as focusing on specific symbols 144 or regions 156 of the interface to input transaction details.

The gaze-tracking module 118 may receive the selected transaction details and eye movement data 106, generating an adaptive gaze tensor 120. The neuromorphic computing module 124 may process this biometric data and update the adaptive gaze tensor 120 when changes in behavior 126 may be detected, providing an additional layer of security by verifying the user's authentic gaze patterns. The authentication module 128 may generate a dynamic encryption key 130 based on the adaptive gaze tensor 120. This encryption key 130 may be used to encrypt the transaction details, creating an encrypted message 132. The authentication module 128 may verify the user's identity through the authentication status 194 before authorizing any financial transactions.

The communication module 134 may transmit the encrypted transaction data to the blockchain network 136, where the blockchain transaction 212 may be recorded on the immutable ledger 210. The system 100 may provide real-time feedback 192 through the user interface module 112, confirming transaction status and maintaining a secure record of all banking activities.

The memory 110 may securely store all transaction data and authentication credentials in the database 116, employing secondary encryption to protect sensitive financial information. The neuromorphic computing module 124 may continuously authenticate the user based on their eye movement data 106 and adaptive gaze tensor 120 throughout the banking session, ensuring ongoing security.

Example 4: Message and Posting Exchange on Social Media Platform

Users may engage with social media 206 and messaging applications 208 through the system 100 using hands-free interaction. The eye-tracking device 102 may capture the user's eye movements 104 and generate eye movement data 106 while navigating the social media interface. The user interface module 112 may display message options 114 within the social media 206 platform, allowing users to compose posts and messages through gaze-based interaction 152. Users may select symbols 144, symbol groups 146, or interact with specific regions 156 of the interface to create content without tactile inputs.

The gaze-tracking module 118 may receive the selected message options 114 and eye movement data 106, generating an adaptive gaze tensor 120. The AI module 122 may assist in processing the adaptive gaze tensor 120 through the machine vision algorithm 176, enabling natural interaction with the social platform. The neuromorphic computing module 124 may process and update the adaptive gaze tensor 120 when changes in behavior 126 may be detected, ensuring secure authentication throughout the social media session. The system 100 may provide real-time feedback 192 through the user interface module 112, displaying the message log 196 of ongoing conversations with other accounts.

For private messaging, the authentication module 128 may generate a dynamic encryption key 130 based on the adaptive gaze tensor 120. This encryption key 130 may be used to encrypt message options 114, creating encrypted messages 132. The communication module 134 may also transmit these encrypted messages to the blockchain network 136, where they may be secured through blockchain transactions 212 on the immutable ledger 210.

The memory 110 may securely store all encrypted messages 132 relating to the social media content and messaging data in the database 116, employing secondary encryption to protect private communications. The hands-free nature of the system 100 may enhance accessibility while maintaining security, allowing users to engage with social platforms through natural eye movements rather than tactile keyboard inputs.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A system for secure optical encryption and authentication for a user within an extended reality space, comprising:
- an eye-tracking device configured to capture an eye movement of a user and generate an eye movement data;
- a processor; and
- a memory in communication with the processor, the memory including a user interface module, a gaze-tracking module, a neuromorphic computing module, and an authentication module;
- wherein:
  - the user interface module is configured to:
    - display a message option to the user and allow the user to select the message option;
  - the gaze-tracking module is configured to:
    - receive the message option from the user interface module and the eye movement data from the eye-tracking device, and
    - generate an adaptive gaze tensor based on the message option and the eye movement data;
  - the neuromorphic computing module is configured to:
    - receive the eye movement data and the adaptive gaze tensor from the gaze-tracking module, and
    - update the adaptive gaze tensor when a change in behavior is found in the eye movement data; and
  - the authentication module is configured to:
    - receive the adaptive gaze tensor from the neuromorphic computing module, and
    - generate an encryption key based on the adaptive gaze tensor.

2. The system of claim 1, wherein the eye-tracking device includes a member selected from a group consisting of an infrared sensor, a video-based eye tracker, and combinations thereof.

3. The system of claim 1, wherein the message option includes a keyboard configured to allow a user to select one or more symbols located on the keyboard.

4. The system of claim 1, wherein the neuromorphic computing module is further configured to authenticate the user based on the eye movement data and the adaptive gaze tensor from the gaze-tracking module.

5. The system of claim 1, wherein the neuromorphic computing module is further configured to provide a real-time feedback to the user interface module based on the adaptive gaze tensor.

6. The system of claim 1, wherein the authentication module is further configured to generate the encryption key using an encryption function, the encryption function including a member selected from a group consisting of a dual space representation, a bilinear map, and combinations thereof.

7. The system of claim 1, wherein the authentication module is further configured to:
- encrypt the message option based on the encryption key thereby creating an encrypted message; and
- provide the encrypted message to the user interface module.

8. The system of claim 6, wherein:

the memory further includes a communication module configured to receive and transmit the encryption key and the encrypted message to a blockchain network; and the authentication module is further configured to secure the encryption key and the encrypted message on the blockchain network via the communication module.

9. The system of claim 1, wherein the memory includes a database configured to store the message option, the adaptive gaze tensor, and the encryption key.

10. The system of claim 9, wherein the neuromorphic computing module is further configured to:

receive another adaptive gaze tensor from the database, and update the another adaptive gaze tensor when a change in behavior is found in the eye movement data.

11. A method for secure optical encryption and authentication for a user within an extended reality space, comprising:

providing a system including:

an eye-tracking device configured to capture an eye movement of a user and generate an eye movement data;

a processor; and a memory in communication with the processor, the memory including a user interface module, a gaze-tracking module, a neuromorphic computing module, and an authentication module, wherein:

the eye-tracking device is configured to:

capture an eye movement of a user and generate an eye movement data, the user interface module is configured to:

display a message option to the user and allow the user to select the message option, the gaze-tracking module is configured to:

receive the message option from the user interface module and the eye movement data from the eye-tracking device, and generate an adaptive gaze tensor based on the message option and the eye movement data, the neuromorphic computing module is configured to:

receive the eye movement data and the adaptive gaze tensor from the gaze-tracking module, and update the adaptive gaze tensor when a change in behavior is found in the eye movement data, and the authentication module is configured to:

receive the adaptive gaze tensor from the neuromorphic computing module, and generate an encryption key based on the adaptive gaze tensor;

displaying the message option to the user and allowing the user to select the message option via the user interface module;

capturing the eye movement of the user and generating the eye movement data via the eye-tracking device;

receiving the message option from the user interface module and the eye movement data from the eye-tracking device and generating an adaptive gaze tensor based on the message option and the eye movement data via gaze-tracking module;

receiving the eye movement data and the adaptive gaze tensor from the gaze-tracking module and updating the adaptive gaze tensor when a change in behavior is found in the eye movement data via the neuromorphic computing module; and receiving the adaptive gaze tensor from the neuromorphic computing module and generating an encryption key based on adaptive gaze tensor via the authentication module.

12. The method of claim 11, wherein:

the eye-tracking device includes an infrared sensor; and the method further comprises:

capturing an eye movement of a user via the infrared sensor, and generating an eye movement data via the infrared sensor.

13. The method of claim 11, wherein:

the eye-tracking device includes a video-based eye tracker; and the method further comprises:

capturing an eye movement of a user via the video-based eye tracker, and generating an eye movement data via the video-based eye tracker.

14. The method of claim 11, wherein:

the message option includes a keyboard configured to allow a user to select one or more symbols located on the keyboard; and the method further comprises:

allowing a user to select one or more symbols located on the keyboard.

15. The method of claim 11, wherein:

the authentication module is further configured to generate the encryption key using a encryption function, the encryption function including a member selected from a group consisting of a dual space representation, a bilinear map, and combinations thereof; and the method further comprises:

generating the encryption key using an encryption function, the encryption function including a member selected from a group consisting of a dual space representation, a bilinear map, and combinations thereof.

16. The method of claim 11, wherein:

the authentication module is further configured to encrypt the message option based on the encryption key thereby creating an encrypted message, and provide the encrypted message to the user interface module; and the method further comprises:

encrypting the message option via the authentication module based on the encryption key thereby creating an encrypted message; and providing the encrypted message to the user interface module.

17. The method of claim 11, wherein:

the neuromorphic computing module is further configured to authenticate the user based on the eye movement data and the adaptive gaze tensor from the gaze-tracking module; and the method further comprises:

authenticating the user based on the eye movement data and the adaptive gaze tensor.

18. The method of claim 11, wherein:

the neuromorphic computing module is configured to provide a real-time feedback to the user interface module based on the adaptive gaze tensor; and the method further comprises:

providing a real-time feedback to the user interface module based on the adaptive gaze tensor.

19. The method of claim 11, further comprising:

providing in the memory a database configured to securely store the message option, the adaptive gaze tensor, and the encryption key; and storing the message option, the adaptive gaze tensor, and the encryption key in the database.

20. A non-transitory computer-readable medium storing instructions for secure optical encryption and authentication for a user that, when executed by a processor, cause the processor to:

display a message option to the user;

allow the user to select the message option;

capture an eye movement of the user, generate an eye movement data;

generate an adaptive gaze tensor based on the message option and the eye movement data;

update the adaptive gaze tensor when a change in behavior is found in the eye movement data; and generate an encryption key based on the adaptive gaze tensor.

* * * * *